United States Patent
Annucci

(10) Patent No.: US 12,383,383 B2
(45) Date of Patent: Aug. 12, 2025

(54) CLOSING HOLES IN A THREE-DIMENSIONAL DIGITAL PREPARATION MODEL

(71) Applicant: EXOCAD GMBH, Darmstadt (DE)

(72) Inventor: Marco Annucci, Rome (IT)

(73) Assignee: EXOCAD GMBH, Darmstadt (DE)

( * ) Notice: Subject to any disclaimer, the term of this patent is extended or adjusted under 35 U.S.C. 154(b) by 233 days.

(21) Appl. No.: 18/108,753

(22) Filed: Feb. 13, 2023

(65) Prior Publication Data

US 2024/0268938 A1 Aug. 15, 2024

(51) Int. Cl.
| | | |
|---|---|---|
| *A61C 13/00* | (2006.01) | |
| *A61C 9/00* | (2006.01) | |
| *A61C 13/08* | (2006.01) | |
| *A61C 13/20* | (2006.01) | |
| *B33Y 80/00* | (2015.01) | |

(52) U.S. Cl.
CPC .......... *A61C 13/0004* (2013.01); *A61C 9/004* (2013.01); *A61C 13/081* (2013.01); *A61C 13/20* (2013.01); *B33Y 80/00* (2014.12); *G06T 2207/30036* (2013.01)

(58) Field of Classification Search
CPC ... A61C 13/0004; A61C 9/004; A61C 13/081; A61C 13/20; G06T 2207/30036; B33Y 80/00
USPC .......................................................... 345/419
See application file for complete search history.

(56) References Cited

U.S. PATENT DOCUMENTS

| | | | | |
|---|---|---|---|---|
| 5,121,334 A * | 6/1992 | Riley | ................. | G05B 19/4207 715/850 |
| 5,128,870 A * | 7/1992 | Erdman | ............... | A61C 9/0046 700/182 |
| 5,184,306 A * | 2/1993 | Erdman | ............. | G05B 19/4207 700/182 |
| 5,257,203 A * | 10/1993 | Riley | ................. | G05B 19/4099 700/182 |
| 7,084,868 B2 * | 8/2006 | Farag | ...................... | G06T 17/00 345/419 |
| 9,454,846 B2 | 9/2016 | Pesach et al. | | |
| 2006/0063135 A1 * | 3/2006 | Mehl | ...................... | G06F 18/28 433/213 |

(Continued)

FOREIGN PATENT DOCUMENTS

WO WO-2021262336 A1 12/2021

OTHER PUBLICATIONS

_-2015_-_ John_Wiley_and_Sons (Year: 2015).*

*Primary Examiner* — YuJang Tswei

(74) *Attorney, Agent, or Firm* — PERRY + CURRIER INC.

(57) ABSTRACT

Disclosed is a computer-implemented method for closing one or more holes in a bottom section of a three-dimensional digital preparation model of a preparation of a tooth. The tooth is prepared for receiving a dental restoration element with a lower limit of the bottom section of the preparation being prepared in form of a stepless edge. The method comprises receiving the three-dimensional digital preparation model of the prepared tooth. One or more holes of the three-dimensional digital preparation model to be closed are detected within the bottom section. A preparation angle used for preparing the bottom section is determined and the detected one or more holes are closed. The closing comprises an extrapolation of the bottom section into the holes using the determined preparation angle.

20 Claims, 16 Drawing Sheets

(56) References Cited

U.S. PATENT DOCUMENTS

| | | | |
|---|---|---|---|
| 2011/0117522 A1* | 5/2011 | Verma | A61C 8/0025 |
| | | | 433/174 |
| 2013/0041630 A1* | 2/2013 | Gilles | A61C 9/002 |
| | | | 703/1 |
| 2014/0335470 A1* | 11/2014 | Fisker | G06F 30/00 |
| | | | 700/98 |
| 2016/0302895 A1 | 10/2016 | Rohaly et al. | |
| 2017/0071704 A1* | 3/2017 | Huwais | A61C 1/0061 |
| 2019/0029695 A1* | 1/2019 | Huwais | A61B 17/1673 |
| 2021/0177556 A1* | 6/2021 | Kopelman | G16H 30/20 |
| 2022/0151756 A1* | 5/2022 | Pesach | A61B 5/4547 |

* cited by examiner

CLOSING HOLES IN A THREE-DIMENSIONAL DIGITAL PREPARATION MODEL

FIELD OF THE INVENTION

The invention relates to the field of dental technology, in particular to a closing of holes in a three-dimensional digital preparation model.

BACKGROUND

In modern dental technology, scans of preparations of teeth are used for providing three-dimensional digital preparation models. Such three-dimensional digital preparation models may, e.g., be used for planning dental restoration elements to be arranged on prepared teeth described by the three-dimensional digital preparation models. However, due to incomplete and/or erroneous acquisition of scan data, the three-dimensional digital preparation models provided using the incomplete and/or erroneous scan data may be incomplete. The three-dimensional digital preparation models may comprise holes, in particular in a bottom section, which is challenging to be scanned accurately. These holes may cause problems, when trying to use the three-dimensional digital preparation models, e.g., for planning dental restoration elements. These problems may even prevent the three-dimensional digital preparation models from being used at all. Without any possibility to handle these holes, the scans may have to be repeated. However, there is no guarantee that the repeated scan may be better than the previous one, e.g., complete and free of errors.

It is an objective to provide for a computer-implemented method for closing one or more holes in a bottom section of a three-dimensional digital preparation model of a preparation of a tooth, a computer program product for closing one or more holes in a bottom section of a three-dimensional digital preparation model of a preparation of a tooth, a computer device for closing one or more holes in a bottom section of a three-dimensional digital preparation model of a preparation of a tooth, and a system comprising such a computer device.

SUMMARY

In one aspect a computer-implemented method for closing one or more holes in a bottom section of a three-dimensional digital preparation model of a preparation of a tooth is disclosed. The tooth is prepared for receiving a dental restoration element with a lower limit of the bottom section of the preparation being prepared in form of a stepless edge. The method comprises receiving the three-dimensional digital preparation model of the prepared tooth. One or more holes of the three-dimensional digital preparation model to be closed are detected within the bottom section. A preparation angle used for preparing the bottom section is determined. The preparation angle is descriptive of an inclination of the bottom section relative to a reference direction. The detected one or more holes are close. The closing comprises an extrapolation of the bottom section into the holes using the determined preparation angle.

This may have the beneficial effect of enabling an automatic completion of three-dimensional digital preparation model generated using incomplete, inaccurate and/or erroneous scan data of a prepared tooth.

The tooth may, e.g., be prepared using a tapered bur, i.e., a tapered dental drill, also referred to as a flame-shaped bur, to remove tooth material. The preparation may comprise removing tooth material following a gingival contour around the tooth to be prepared for receiving the dental restoration element. Thus, undercuts of the natural tooth may be erased and an adequate fit of the dental restoration element on the prepared tooth enabled. Furthermore, by removing tooth material free space may be provided for receiving the dental restoration element, which may comprise a pre-defined minimum material thickness in order to ensure a sufficient mechanical stability of the dental restoration element.

Removing tooth material below the level of the gingiva contour line, may require scanning the bottom section of the prepared tooth even blow the level of the gingiva contour line, i.e., within the gingival sulcus. In order to be able to scan the gingival sulcus, the gingival sulcus may have to be widened, e.g., by temporarily inserting material in the gingival sulcus. For example, a fiber may be inserted in the gingival sulcus around the prepared tooth. In addition to the fiber, astringent retraction paste may be used for a temporarily retraction of the gingiva surrounding the tooth resulting in a widening of the gingival sulcus and for drainage of the sulcus. The astringent retraction paste may, e.g., be injected directly into the gingival sulcus.

The widening of the gingival sulcus may facilitate a direct scan of the bottom section of the prepared tooth extending into the gingival sulcus or an insertion of an impression material, like silicone, for the purpose of acquiring an impression of the bottom section of the prepared tooth extending into the gingival sulcus.

The gingival sulcus is a recess extending circularly around the tooth between the neck of the tooth and the gingiva. The base of the sulcus is formed by the supra-alveolar fibrous apparatus, periodontal ligament, which reinforces the not particularly firm adhesion between the tooth surface and the epithelial attachment. At the base of the gingival sulcus lies the junctional epithelium, which thus in health defines the base of the gingival sulcus.

The stepless edge may, e.g., be a stepless feather edge or a stepless knife edge. Using a stepless preparation method may have the beneficial effect of reducing the risk of a receding of the gingiva to the finishing line of the preparation, as it may occur in case of a preparation comprising a step. Such a receding of the gingiva may even lead to an exposure of the finishing line of the preparation and the margin of the dental restoration element, which may be undesirable for aesthetical reasons.

Furthermore, due to the way the dental restoration element rests on the step, in case the finishing line comprises a step, pressure may be exerted on the thinner edges of the prepared tooth near the finishing line, which support the step preparation crown and may be break off due to mechanical stress.

In case of a finishing line in form of a stepless edge, e.g., a stepless feather edge or a stepless knife edge, the tooth is prepared without a step. This may have the beneficial effect that a receding of the gingiva as well as mechanical damages of the tooth may be avoided. A stepless preparation is also referred to as a vertical preparation, since its horizontal limit is not clearly defined. Such a stepless edge preparation is oriented by the biological conditions of the tooth to be prepared. No artificial step is introduced, but rather natural transition between prepared tooth section an unprepared tooth section implemented.

The tooth is, e.g., prepared also below the gingiva contour level. A stepless finishing line of the preparation may be created. This finishing line may, e.g., extend circumferentially around the tooth following the contour of a gingival top edge of the gingiva surrounding the tooth, as the dentist may follow this contour of a gingival top edge with is bur working constantly down to the same depth below the level of the gingiva contour. Thus, the resulting finishing line may mimic the form of the contour of the gingival top edge of the biological gingiva. The circumferential size of the tooth may thus be reduced in an apical direction down to a predefined depth below the level of the gingiva contour, e.g., 4 mm below the level of the gingiva contour.

When scanning the tooth below the level of the gingiva contour, i.e., scanning the gingival sulcus surrounding the tooth, the gingival sulcus and thus the extension of the tooth below the level of the gingiva contour may be scanned down to a maximum scan depth. The gingival sulcus may, e.g., be scanned directly or the gingival sulcus may, e.g., be scanned indirectly by scanning an impression of the gingival sulcus. The maximum scan depth results in a maximum scan depth line defining a lower boundary of a three-dimensional digital preparation model of the prepared tooth being generated using the scan data of the prepared tooth. This boundary defines the depth to which the scan was performed. However, due to difficulties often occurring, when trying to scan the gingival sulcus, e.g., due to a limited opening of the gingival sulcus, irregularities of the width of the gingival sulcus, liquid collecting in the gingival sulcus and/or artifacts in the acquired scan data, the scan depth may be irregular. Thus, the scan depth may not be constant. Consequently, the three-dimensional digital preparation model of the prepared tooth may comprise an irregular lower boundary and holes extending into a bottom section of the three-dimensional digital preparation model, which is delimited from below by the lower boundary. For example, the gingival sulcus may not have been scanned deep enough everywhere for defining a margin line for the dental restoration element to be arranged below the level of the gingiva contour.

The level of the gingiva contour may be defined by projecting the horizontal gingiva contour line of the top edge of the three-dimensional digital gingiva model descriptive of the gingiva surrounding the prepared tooth onto the three-dimensional digital preparation model, i.e., the bottom section of the three-dimensional digital preparation model. This level of the gingiva contour may also be referred to as the gingival height.

In case a preparation method defines an edge, i.e., finishing line, comprising a step, like a chamfer or shoulder finishing line, the dental restoration element may be defined and manufactured comprising a margin, which is defined by the finishing line of the preparation and precisely matches the same. In case of a stepless edge, there is no defined and easily detectable finishing line, which may be used for defining the margin line.

In order to define a margin line for the dental restoration element for a stepless edge below the level of the gingiva contour, points on the three-dimensional digital preparation model may be determined from the projected gingiva contour line downwards in a predefined distance, e.g., 0.5 to 2.5 mm. However, in order to be able to determine such points on the three-dimensional digital preparation model in the predefined distance below the projected gingiva contour line downwards the three-dimensional digital preparation model down to this depth without holes.

A three-dimensional digital preparation model being generated using real scan data may in general comprise holes in a bottom section, such that the respective three-dimensional digital preparation model may not continuously extend down to a required depth for determining points in order to define a margin line below the projected gingiva contour line. The margin line defines a lower boundary of the dental restoration element to be manufactured for the prepared tooth. The position of the margin line defines how deep the dental restoration element to be manufactured will extend below the projected gingiva contour line, i.e., how deep into the gingival sulcus. The depth of the dental restoration element to be manufactured extending into the gingival sulcus, i.e., the distance between the projected gingiva contour line and the margin line arranged below the projected gingiva contour line may, e.g., be 1 mm. The form of the margin line, e.g., extending parallel to the projected gingiva contour line, defines the form of the lower boundary of the dental restoration element to be manufactured.

Scan data acquired of the dental sulcus may be incomplete. For example, errors may occur and the bottom section of the preprepared tooth extending below the level of the gingiva contour into the gingival sulcus may not be scanned completely. Such error and incompletions may, e.g., be caused by a limited opening of the gingival sulcus, irregularities of the width of the gingival sulcus, liquid collecting in the gingival sulcus and/or artifacts in the acquired scan data. Thus, a three-dimensional digital preparation model generated using this incomplete scan data may be incomplete and comprise holes, e.g., extending in the bottom section of the preprepared tooth extending below the level of the gingiva contour, such that it cannot be fully processed. Problems arising from the holes, which, e.g., originate from incomplete scan data, may be resolve by closing these holes according to method described herein.

An exemplary method may, e.g., comprise acquiring scan data of the prepared tooth and the gingiva surrounding the prepared tooth. The can data may in particular comprise scan data of the gingival sulcus extending around the prepared tooth between the gingiva and the tooth. The acquired scan data may be used to generate a three-dimensional digital preparation model of the preparation of the tooth, i.e., the prepared tooth. The three-dimensional digital preparation model may extend down to a maximum scan depth below the level of the gingiva contour of the surrounding gingiva defined by a lower boundary of the three-dimensional digital preparation model. Furthermore, a three-dimensional digital gingiva model of the gingiva surrounding the prepared tooth may be generated.

For example, one or more deepest points of the gingival sulcus, i.e., deepest points of the of the lower boundary of the three-dimensional digital preparation model may be determined. These deepest points of the lower boundary of the three-dimensional digital preparation model mark a maximum scan depth.

Projecting a horizontal gingiva contour line of a top edge of the three-dimensional digital gingiva model onto the three-dimensional digital preparation model defining the gingival height. In order to be able to projecting a horizontal gingiva contour line onto a bottom section of the three-dimensional digital preparation model for determining the gingival height, the three-dimensional digital preparation model has to be complete at the projection location, i.e., no holes should extend over the projection location.

Determining a location for defining a margin line defining a lower boundary of the dental restoration element to be manufactured for the prepared tooth. The margin line may, e.g., be placed in a predefined distance below the projected gingiva contour line, e.g., in a distance of 0.5 mm to 2.5 mm below the projected gingiva contour line.

In order to be able to define the margin line on the bottom section of the three-dimensional digital preparation model below the projected gingiva contour line, the three-dimensional digital preparation model has to be complete at the location determined for the margin line, i.e., no holes should extend over the respective location. Furthermore, the three-dimensional digital preparation model should extend far enough down, to cover the location determined for the margin line. That is, the lower boundary of the three-dimensional digital preparation model should be arranged below or at least on the same level as the location determined for the margin line. For example, the lower boundary of the three-dimensional digital preparation model should circumferentially be arranged below or at least on the same level as the location determined for the margin line Furthermore, in order to be able to generate a three-dimensional digital restoration model using the three-dimensional digital preparation model, the three-dimensional digital preparation model should be complete, also in the bottom section extending down to the margin line.

In case the bottom section of the three-dimensional digital preparation model is incomplete, e.g., comprises one of more holes and/or does not extend far enough down for defining the margin line, the three-dimensional digital preparation model may be completed using the preparation angle determined for the preparation of the bottom section of the three-dimensional digital preparation model. For example, the one of more holes may be closed using the determined preparation angle. For example, the three-dimensional digital preparation model may be extended further down, i.e., in apical direction, using determined preparation angle.

For example, a preparation angle of the bottom section may be determined in the vicinity of a hole to be closed. For example, the preparation may be determined in the bottom section between the projected gingiva contour line and the location determined for defining the margin line. Alternatively, the preparation angle may be determined using a taper angle of a tapered bur used for preparing the bottom section.

Furthermore, the three-dimensional digital preparation model may be extended further down, i.e., in apical direction, using determined preparation angle. The three-dimensional digital preparation model may be extended from a lower boundary down to a bottom line determined using the lowest points of the three-dimensional digital preparation model.

For example, a single lowest point may be sufficient to define a bottom line, e.g., parallel to the projected gingiva contour line.

The closing of holes and/or the extending of the three-dimensional digital preparation model further down to a bottom line may be implemented as an automated completion of incomplete three-dimensional digital preparation models. This may be beneficial in case of a plurality of prepared teeth to be scanned. The individual scan does not have to be absolutely accurate. Incompletions of the three-dimensional digital preparation models resulting from an inaccurate scan may be completed automatically. Thus, shorter scan times per tooth may be enabled. Furthermore, using the automated completion scans of prepared teeth may be less prone to errors.

A three-dimensional digital preparation model describing a preparation of a tooth may, e.g., be used for defining a dental restoration model, i.e., for generating a three-dimensional digital restoration model defining the dental restoration model. For generating three-dimensional digital restoration model, it may be in particular necessary to define a margin line of the dental restoration element, i.e., a lower end of the dental restoration element. Such a three-dimensional digital preparation model model, e.g., in form of a polygon mesh, may, e.g., be provided using scan data of a scan of the prepared tooth or of a scan of an impression of the prepared tooth.

However, e.g., due to errors and/or inaccuracies in the data acquisition, parts of the three-dimensional digital model of the prepared tooth may be missing. The model may have holes, where scan data is missing. This may in particular be the case for a lower section of the three-dimensional digital restoration model extending below the level of the gingiva contour, i.e., the finishing area within the gingival sulcus. In order to be able to define a margin line and a geometric form of the dental restoration element also below the level of the gingiva contours, holes within the finishing area may have to be closed.

The method for closing holes of a three-dimensional digital preparation model of the prepared tooth using the determined preparation angle may provide an effective and efficient approach for closing holes within a finishing area of the prepared tooth. The three-dimensional digital preparation model may, e.g., be provided in form of a polygon mesh comprising one or more holes extending within the finishing area.

For example, the reference direction is a vertical reference direction. The vertical reference direction is, e.g., defined as the coronal direction. The vertical reference direction is, e.g., defined as an occlusal direction, i.e., a direction along a normal on an occlusal plane.

For example, the preparation angle at a point P within the bottom section is defined as an angle between a straight vertical line intersecting point P and a tangent at point P.

For example, the preparation angle is an averaged angle defined as an angle between a vertical line and line intersecting a first point and a second point of a horizontal projection of the vertical line onto the bottom section.

The three-dimensional digital preparation model of the prepared tooth is descriptive of a form, i.e., a current state, of the prepared tooth. The three-dimensional digital preparation model may be provided using scan data of the respective prepared tooth of the patient acquired using a scanner, e.g., an optical scanner. The scan may be a direct scan of the prepared tooth, e.g., an intraoral scan. Alternatively or additionally, an indirect scan of the prepared tooth may be used to acquire the scan data. For example, a dental impression of the prepared tooth or a dental model of the prepared, like a plaster model or a silicone model, may be scanned.

For example, the scan data of the prepared tooth may be comprised by scan data of a patient's dentition comprising the prepared tooth. The scan data of the dentition may be acquired using a scanner, e.g., an optical scanner. The scan may be a direct scan of the patient's dentition, e.g., an intraoral scan. Alternatively or additionally, an indirect scan of the patient's dentition may be used to acquire the scan data. For example, a dental impression of the patient's dentition or a dental model of the dentition, like a plaster model or a silicone model, may be scanned.

The three-dimensional digital preparation model may, e.g., be provided as part of a three-dimensional digital dentition model of the dentition of the patient. The three-dimensional digital dentition model of the dentition of the patient may be provided using scan data of the patient's dentition. The three-dimensional digital preparation model may be identified within the three-dimensional digital dentition model of the dentition of the patient using segmentation.

The three-dimensional digital preparation model may be a three-dimensional digital model of a current state of the prepared tooth. This three-dimensional digital preparation model as a current state model of the prepared tooth may resemble an actual state of the prepared tooth, i.e., it may be a digital replica of the prepared physical tooth. The three-dimensional digital preparation model may, in particular, resemble the geometric form of the prepared tooth. The three-dimensional digital preparation model may, e.g., be generated by the computer system executing the method using scan data of the prepared tooth or it may be received from an external source. The external source may, e.g., be a server, like a cloud server, providing the three-dimensional digital preparation model via a network. The external source may, e.g., be a removable storage device providing the three-dimensional digital preparation model via a direct communication connection, e.g., wireless or via a wire.

The three-dimensional digital preparation model may be provided as part of a three-dimensional digital dentition model of the dentition of the patient. The three-dimensional digital dentition model may be a three-dimensional digital model of a current state the dentition. This three-dimensional digital dentition model may be generated using the scan data of a direct and/or indirect scan of the dentition. The three-dimensional digital dentition model as a current state model of the respective dentition may resemble an actual state of the patient's dentition, i.e., it may be a digital replica of the physical dentition. The three-dimensional digital dentition model of the respective tooth may, in particular, resemble the geometric form of the physical dentition as well as the relative positions of the teeth comprised by the dentition. The three-dimensional digital dentition model may be generated by the computer system or it may be received from an external source. The external source may, e.g., be a server, like a cloud server, providing the three-dimensional digital dentition model via a network. The external source may, e.g., be a removable storage device providing the three-dimensional digital dentition model via a direct communication connection, e.g., wireless or via a wire.

For example, the bottom section is tapered in a coronal direction of the prepared tooth. For example, a taper angle of the tapered bottom section may be determined as the preparation angle to be used for closing holes within the bottom section.

For example, the bottom section extends straight in the coronal direction of the prepared tooth, e.g., vertical or with a tapering in the coronal direction of the prepared tooth For example, the bottom section comprises a curvature in the coronal direction of the prepared tooth, i.e., when following the bottom section in the coronal direction, the bottom section may define a curve. The curvature may, e.g., be a convex curvature. The curvature may, e.g., be a concave curvature.

For example, the bottom section comprises an undercut in the coronal direction of the prepared tooth. Providing an undercut in the coronal direction, i.e., an insertion direction along which the dental restoration element may be arranged on the prepared tooth, may enable a snap connection between the dental restoration element and the prepared tooth. For example, the dental restoration element may comprise one or more detents to be arranged in the undercut, in order to close the snap connection.

For example, the received three-dimensional digital preparation model is generated using scan data of one of the following: the prepared tooth, an impression of the prepared tooth, a physical model of the prepared tooth. Using scan data, an accurate digital copy of a current state, i.e., form of the prepared tooth may be provided.

For example, further comprises selecting a location for defining a margin line for the dental restoration element on the bottom section. One or more holes of the detected one or more holes to be closed extend across the selected location for the margin line. After the closing of the one or more holes to be closed, the margin line for the dental restoration element is defined at the selected location for the margin line on the bottom section across the one or more closed holes.

This may have the beneficial effect, that a margin line describing a lower limit of the dental preparation element to be arranged on the tooth, in order to retore the same, may be defined, even in case the three-dimensional digital preparation model is incomplete and comprises holes in the bottom section.

The preparation of the tooth may result in a finishing line, i.e., a borderline, at which the preparation ends. This finishing line may, e.g., extend circumferentially around the tooth. In case of a preparation resulting, e.g., in a chamfer, a bevel, a shoulder of a beveled shoulder finishing line, a margin of the finishing line may be clearly detectable and usable for defining a margin for the dental restoration element.

However, e.g., in case of a feather edge finishing line or a knife edge finishing line, the finishing lien resulting from the preparation may not provide a clearly defined and detectable margin, which could be used for defining a margin for the dental restoration element.

Example may have the beneficial effect of enabling a definition of a margin line even in case of a preparation, which does not provide a clear definition finishing line, a in case of a feather edge finishing line or a knife edge finishing line.

For example, the margin line extends circumferentially around the bottom section. Thus, a margin line for a lower limit of the dental restoration element extending circumferentially around the bottom section may be provided. Alternatively, only a section of the margin line defining a limit of the dental restoration element may extend within the bottom section.

For example, the method further comprises receiving a three-dimensional digital gingiva model of a gingiva surrounding the prepared tooth. A horizontal gingiva contour line of a top edge of the three-dimensional digital gingiva model is projected onto the bottom section of the three-dimensional digital preparation model. The projected gingiva contour line extends circumferentially around the bottom section. The location for the margin line on the bottom section is selected in a first predefined distance below the projected gingiva contour line.

This may have the beneficial effect, that a gingival height defined by the projected gingiva contour line may be taken into account for defining the margin line, i.e., the lower limit of the dental restoration element. In order to ensure that the lower limit of the dental restoration element remains invisible, the margin line may be arranged below the projected gingiva contour line. Thus, the projected gingiva contour line may be used as a reference height for selecting the location of the margin line within the bottom section.

The location for the margin line on the bottom section may, e.g., be selected below the projected gingiva contour line such that a location for a section of the margin line extends below the projected gingiva contour line, while a location for a rest of the margin line extends above the projected gingiva contour line. Thus, when defining the margin line at the selected location, a section of the margin line may, e.g., extend below the projected gingiva contour line, while the rest of the margin line extends above the projected gingiva contour line.

Alternatively, the location for the whole margin line on the bottom section may, e.g., be selected below the projected gingiva contour line such that, when defining the margin line at the selected location, the whole margin line may, e.g., extend below the projected gingiva contour line.

To define a margin line for the dental restoration element, the gingival contour line may be projected onto the three-dimensional digital preparation model. This projected gingival contour line may be used as a reference line for defining the margin line., such that a section of or the whole margin line is arranged below the projected gingival contour line resulting in a lower limit defined for the dental restoration element arranged below the gingival contour line of an upper edge of the gingiva surrounding the prepared tooth.

The three-dimensional digital gingiva model of gingiva surrounding the prepared tooth is descriptive of a form, i.e., a current state, of the of gingiva surrounding the prepared tooth. The three-dimensional digital gingiva model may be provided using scan data of the gingiva of the patient acquired using a scanner, e.g., an optical scanner. The scan may be a direct scan of the gingiva, e.g., an intraoral scan. Alternatively or additionally, an indirect scan of the gingiva may be used to acquire the scan data. For example, a dental impression of the gingiva or a dental model of the prepared, like a plaster model or a silicone model, may be scanned.

For example, the scan data of the gingiva may be comprised by scan data of a patient's dentition comprising the gingiva surrounding the prepared tooth. The scan data of the dentition may be acquired using a scanner, e.g., an optical scanner. The scan may be a direct scan of the patient's dentition, e.g., an intraoral scan. Alternatively or additionally, an indirect scan of the patient's dentition may be used to acquire the scan data. For example, a dental impression of the patient's dentition or a dental model of the dentition, like a plaster model or a silicone model, may be scanned.

The three-dimensional digital gingiva model may, e.g., be provided as part of a three-dimensional digital dentition model of the dentition of the patient. The three-dimensional digital dentition model of the dentition of the patient may be provided using scan data of the patient's dentition. The three-dimensional digital gingiva model may be identified within the three-dimensional digital dentition model of the dentition of the patient using segmentation.

The three-dimensional digital gingiva model may be a three-dimensional digital model of a current state of the gingiva. This three-dimensional digital gingiva model as a current state model of the gingiva may resemble an actual state of the gingiva, i.e., it may be a digital replica of the prepared physical tooth. The three-dimensional digital gingiva model may, in particular, resemble the geometric form of the gingiva. The three-dimensional digital gingiva model may, e.g., be generated by the computer system executing the method using scan data of the gingiva or it may be received from an external source. The external source may, e.g., be a server, like a cloud server, providing the three-dimensional digital gingiva model via a network. The external source may, e.g., be a removable storage device providing the three-dimensional digital gingiva model via a direct communication connection, e.g., wireless or via a wire.

For example, one or more holes of the detected one or more holes to be closed extend across the projected gingiva contour line. The one or more holes extending across the projected gingiva contour line are closed in order to be able to define the projected contour line.

In case there are holes comprised by the bottom section hindering a projection of the horizontal gingiva contour line onto the bottom section, these holes may be close using the determined preparation angle.

For example, the first predefined distance is a distance in the range from 0.5 to 2.5 mm, preferably from 0.75 to 1.5 mm.

For example, the margin line is defined to extend parallel to the projected gingiva contour line. Thus, a dental restoration element with a lower limit defined by the margin line, may extend below an upper edge of the gingiva surrounding the prepared tooth. This may, e.g., provide a support of the dental restoration element below the upper edge of the gingiva. Furthermore, the lower limit the dental restoration element may be hidden below the upper edge of the gingiva.

For example, at least a section of the margin line may extend parallel to the projected gingiva contour line. For example, the complete margin line may extend parallel to the projected gingiva contour line.

For example, the margin line extends parallel to the projected gingiva contour line circumferentially around the bottom section. Thus, a dental restoration element with a lower limit defined by the margin line, may extend equally deep below an upper edge of the gingiva surrounding the prepared tooth. This may, e.g., provide a support of the dental restoration element below the upper edge of the gingiva distributed equally around the prepared tooth. Furthermore, the lower limit the dental restoration element may be hidden below the upper edge of the gingiva equally well around the prepared tooth.

For example, the received three-dimensional gingiva model is generated using scan data of one of the following: the gingiva surrounding the prepared tooth, an impression of the gingiva surrounding the prepared tooth, a physical model of the gingiva surrounding the prepared tooth. Using scan data, an accurate digital copy of a current state, i.e., form and position of the gingiva surrounding the prepared tooth may be provided.

For example, the closing of the one or more holes comprises extending the bottom section in an apical direction of the prepared tooth. For example, the three dimensional preparation model may not extend far enough down in apical direction. This insufficient extension in apical direction may be considered as one or more holes open at the bottom extending into the bottom section, which have to be closed. A closing of the holes, which are open at the bottom, by extending the bottom section in an apical direction may, e.g., be required for enabling a defining of the margin line on the bottom section and/or a projecting of the gingiva contour line onto the bottom section.

For example, the method further comprises defining a bottom line below the projected gingiva contour line. The bottom line extends circumferentially around the bottom section. The bottom section is extended in the apical direction down to the bottom line. The bottom line may define a lower limit down to which the bottom section is to be extended. The bottom line may be defined below a location selected for the margin line.

Furthermore, a bottom line of the preparation may be defined for the three-dimensional digital preparation model. This bottom line may, e.g., be a bottom line of a gingival sulcus resulting from the preparation. The gingival sulcus refers to an area of potential space between a tooth and the surrounding gingival tissue and is lined by sulcular epithelium. A healthy sulcular depth is, e.g., three millimeters or less.

A margin line for the dental restoration element may, e.g., be defined between the projected gingival contour line and the bottom line of the preparation. The area between the two lines, i.e., the projected gingival contour line and the bottom line of the preparation, is referred to as the finishing area and within this finishing area the margin line may be defined. In particular, the margin line may, e.g., be defined to be parallel to the projected gingival contour.

For example, the defining of the bottom line comprises identifying one or more bottom points of the bottom section and defining the bottom line extending through the identified bottom points. By connecting the one or more bottom points with a line, the bottom line may be defined. The one or more bottom points of the bottom section may be one or more of lowest points in apical direction comprised by the bottom section. In case of a tapering of the bottom section and/or a curvature of the bottom section, this tapering and/or a curvature may be taken into account, when defining the bottom line.

For example, a plane may be defined comprising the identifying one or more bottom points. The bottom section may be extended in apical direction down to the plane. An intersection curve of the extended bottom section with the plane may, e.g., define the bottom line.

For example, the defining of the bottom line comprises identifying a single lowest bottom point and defining the bottom line extending through the identified lowest bottom point parallel to the selected location of the projected gingiva contour line. This may provide an efficient and effective approach for defining the bottom line. In case of a tapering of the bottom section and/or a curvature of the bottom section, this tapering and/or a curvature may be taken into account, when defining the bottom line.

For example, a horizontal plane may be defined comprising the lowest bottom point. The bottom section may be extended in apical direction down to the plane. An intersection curve of the extended bottom section with the plane may, e.g., define the bottom line.

For example, the bottom line is defined in a second predefined distance below and parallel to the selected location of the projected gingiva contour line. The second predefined distance may, e.g., be larger than a first predefined distance used for defining the margin line.

For example, the determined preparation angle is an angle between the projected gingiva contour line and the selected location of the margin line at a circumferential position of the bottom section, at which the bottom section extends down to the selected location of the margin line.

For example, the angle is an angle defined by a first point on the projected gingiva contour line and a second point in apical direction below the first point at the selected location of the margin line. The angle may be defined as an angle between a straight line intersecting the two points and a reference direction, e.g., a vertical direction.

For example, the angle is an angle defined by a first point below the projected gingiva contour line and a second point in apical direction below the first point and above the selected location of the margin line. The angle may be defined as an angle between a straight line intersecting the two points and a reference direction, e.g., a vertical direction.

For example, the angle is an angle defined by a first point below the projected gingiva contour line and a second point in apical direction below the first point and below the selected location of the margin line. The angle may be defined as an angle between a straight line intersecting the two points and a reference direction, e.g., a vertical direction.

For example, the angle is an angle defined by a first point above the projected gingiva contour line and a second point in apical direction below the first point and above the selected location of the margin line. The angle may be defined as an angle between a straight line intersecting the two points and a reference direction, e.g., a vertical direction.

For example, the angle is an angle defined by a first point above the projected gingiva contour line and a second point in apical direction below the first point and below the selected location of the margin line. The angle may be defined as an angle between a straight line intersecting the two points and a reference direction, e.g., a vertical direction For example, the determined preparation angle being an angle between the projected gingiva contour line and the bottom line, at which the bottom section extends down to the bottom line. For example, the determined preparation angle being an angle between the projected gingiva contour line and a bottom point of the bottom section, e.g., a lowest bottom point.

For example, the angle is an angle defined by a first point on the projected gingiva contour line and a second point in apical direction below the first point on the bottom line. The angle may be defined as an angle between a straight line intersecting the two points and a reference direction, e.g., a vertical direction.

For example, the angle is an angle defined by a first point above the projected gingiva contour line and a second point in apical direction below the first point on the bottom line. The angle may be defined as an angle between a straight line intersecting the two points and a reference direction, e.g., a vertical direction.

For example, the angle is an angle defined by a first point below the projected gingiva contour line and a second point in apical direction below the first point on the bottom line. The angle may be defined as an angle between a straight line intersecting the two points and a reference direction, e.g., a vertical direction.

For example, the angle is an angle defined by a first point below the projected gingiva contour line and above the selected location for the margin line as well as a second point in apical direction below the first point on the bottom line. The angle may be defined as an angle between a straight line intersecting the two points and a reference direction, e.g., a vertical direction.

For example, the angle is an angle defined by a first point at the selected location for the margin line and a second point in apical direction below the first point on the bottom line. The angle may be defined as an angle between a straight line intersecting the two points and a reference direction, e.g., a vertical direction.

For example, the angle is an angle defined by a first point below the selected location for the margin line and a second point in apical direction below the first point on the bottom line. The angle may be defined as an angle between a straight line intersecting the two points and a reference direction, e.g., a vertical direction.

For example, the determined preparation angle is a preparation angle measured locally within the bottom section. For example, a tangent to a point comprised by the bottom section may be used for determining the local preparation angle at this point.

For example, the determined preparation angle is an averaged preparation angle determined using a plurality of preparation angles measured locally within the bottom section. For example, a tangents to a plurality of points comprised by the bottom section may be used for determining the local preparation angle at these points, of which an average is calculated and used as the determined preparation angle.

For example, the determined preparation angle is a largest preparation angle of the bottom section. Thus, a largest preparation angle of the bottom section may be used for closing the one or more holes.

For example, the determined preparation angle is constant in the coronal direction of the prepared tooth.

For example, the determined preparation angle is constant in a circumferential direction around the prepared tooth.

For example, the determined preparation angle varies in the coronal direction of the prepared tooth.

For example, the determined preparation angle varies in the circumferential direction around the prepared tooth.

For example, the determined preparation angle is increased by a first predefined amount for the extrapolation of the bottom section.

Increasing the preparation angle may result in a three-dimensional digital restoration model, which is in the area with the closed hole larger than the actual prepared tooth. Thus, a clearance between the prepared tooth and a dental restoration element defined using the three-dimensional digital tooth model may be locally increased, i.e., in the area with the closed hole. This may ensure that the dental restoration element fits on the prepared tooth, while the larger clearance may be closed with additional adhesive, when fixating the dental prothesis on the prepared tooth. In particular irregularities, which may be comprised by the actual prepared tooth in the area of the closed hole, may thus be compensated.

For example, the bottom section comprises a constant preparation angle.

For example, the preparation angle of the bottom section depends on a taper angle of a tapered bur used for preparing the bottom section. The taper angle of the tapered bur is used for determining the preparation angle of the bottom section. When using a tapered bur for preparing the tooth, the prepared bottom section may comprise a taper angle, e.g., a constant taper angel, depending on the taper angle of the tapered bur. For example, the taper angel of the bottom section may be identical to the taper angle of the tapered bur. For example, the taper angel of the bottom section may be identical to the taper angle of the tapered bur plus in inclination angle of an inclination of the tapered bur, e.g., relative to a vertical direction, when preparing the prepared tooth.

For example, the method further comprises generating a three-dimensional digital restoration model of the dental restoration element to be arranged on the prepared tooth using the three-dimensional digital preparation model and the margin line defined for the dental restoration element.

The margin line may be used as a lower limit of the three-dimensional digital restoration model and thus of the dental restoration element. The three-dimensional digital restoration model of the dental restoration element may, e.g., be generated as a digital template for manufacturing the physical dental restoration element.

For generating the three-dimensional digital artificial tooth model, e.g., a three-dimensional digital library tooth model from a digital tooth library may be used. For example, the three-dimensional digital library tooth model may in addition be adjusted to the dentition of the patient. For example, a three-dimensional digital model of another tooth of the patient's dentition, e.g., an opposite tooth of the prepared tooth within the same dental arch or an antagonist, may be used for generating the three-dimensional digital artificial tooth model. The three-dimensional digital model of the other tooth may be generated using scan data of the respective other tooth. For example, the three-dimensional digital model of the other tooth may in addition be adjusted to the dentition of the patient. For example, a three-dimensional digital tooth model descriptive of the form of the prepared tooth before the preparation may be used for generating the generating the three-dimensional digital artificial tooth model. For example, the three-dimensional digital tooth model may be adjusted. For example, the three-dimensional digital artificial tooth model may be generated from scratch.

For example, a trained machine learning module may be used for generating the three-dimensional digital artificial tooth model. For generating the three-dimensional digital artificial tooth model, the trained machine learning module may, e.g., use the three-dimensional digital preparation model. The three-dimensional digital artificial tooth model may be received as output from the trained machine learning module in response to providing the three-dimensional digital preparation model with closed holes as input. For example, the three-dimensional digital preparation model may be provided as part of a three-dimensional digital dentition model as input to the trained machine learning module.

The trained machine learning module may be trained to provide the three-dimensional digital artificial tooth model as output in response to receiving the three-dimensional digital preparation model with closed holes as input. The trained machine learning module may be trained to provide the three-dimensional digital artificial tooth model as output in response to receiving a three-dimensional digital dentition model comprising the three-dimensional digital preparation model as input.

For example, a providing of the trained machine learning module may comprise providing a machine learning module to be trained. A set of training datasets may be provided for training the machine learning module to be trained. For example, each training dataset may comprise a three-dimensional digital training preparation model as well as a three-dimensional digital training artificial tooth model. The machine learning module to be trained may be trained to provide the three-dimensional digital training artificial tooth models of the training datasets as an output in response to receiving the three-dimensional digital training preparation models of the respective training datasets as input.

For example, each training dataset may comprise a three-dimensional digital training dentition model as well as a three-dimensional digital training artificial tooth model. The three-dimensional digital training dentition models may comprise three-dimensional digital training preparation models, for which the three-dimensional digital training artificial tooth model are to be provided. The machine learning module to be trained may be trained to provide the three-dimensional digital training artificial tooth models of the training datasets as an output in response to receiving the three-dimensional digital training dentition models of the respective training datasets as input.

For example, each training dataset may comprise a three-dimensional digital training dentition model as well as a three-dimensional digital training artificial tooth model. The three-dimensional digital training dentition models may comprise one or more three-dimensional digital training preparation models, for which the three-dimensional digital training artificial tooth model are to be provided. The machine learning module to be trained may be trained to provide the three-dimensional digital training artificial tooth models of the training datasets as an output in response to receiving the three-dimensional digital training dentition models of the respective training datasets as input. The three-dimensional digital training artificial tooth models may, e.g., be provided in form of modified three-dimensional digital training dentition models comprising the three-dimensional digital training preparation models. The modified three-dimensional digital training dentition models may correspond to the three-dimensional digital training dentition models used as input with the three-dimensional digital training preparation models replaced by the three-dimensional digital training artificial tooth models.

The machine learning module to be trained may, e.g., be an untrained machine learning module, a pre-trained machine learning module or a partially trained machine learning module. The machine learning module being trained may be an untrained machine learning module, which is trained from scratch. Alternatively, the machine learning module being trained may be a pre-trained or partially trained machine learning module. In general, it may not be necessary to start with an untrained machine learning module, e.g., in deep learning. For example, one may start with a pre-trained or partially trained machine learning module. The pre-trained or partially trained machine learning module may have been pre-trained or partially trained for the same or a similar task. Using a pre-trained or partially trained machine learning may, e.g., enable a faster training of the trained machine learning module to be trained, i.e., the training may converge faster. For example, transfer learning may be used for training a pre-trained or partially trained machine learning module. Transfer learning refers to a machine learning process, which rather than starting the learning process from scratch starts from patterns that have been previously learned, when solving a different problem. This way previous learnings may, e.g., be leveraged, avoiding to start from scratch. A pre-trained machine learning module is a machine learning module that was trained previously, e.g., on a large benchmark dataset to solve a problem similar to the one to be solved by the additional learning. In case of a pre-trained machine learning module a previous learning process has been completed successfully. A partially trained machine learning module is a machine learning module, which has been partially trained, i.e., the training process may not have been completed yet. A pre-trained or partially machine learning module may, e.g., be import and trained to be used for the purposes disclosed herein.

The term "machine learning" (ML) refers to a computer algorithm used to extract useful information from training data sets by building probabilistic models, which are referred to as machine learning modules or models, in an automated way. A machine learning module may also be referred to as a predictive model. Machine learning algorithms build a mathematical model based on sample data, known as "training data", in order to make predictions or decisions without being explicitly programmed to perform the task. The machine learning module may be performed using a learning algorithm such as supervised or unsupervised learning. The machine learning module may be based on various techniques such as clustering, classification, linear regression, reinforcement, self-learning, support vector machines, neural networks, etc. A machine learning module may, e.g., be a data structure or program such as a neural network, in particular a convolutional neural network, a support vector machine, a decision tree, a Bayesian network etc. The machine learning module may be adapted to predict an unmeasured value, e.g., a three-dimensional digital artificial tooth model as output by the trained machine learning module. The trained machine learning module may predict the unmeasured value from other, known values, e.g., a three-dimensional digital preparation model with closed holes as input. The three-dimensional digital preparation model may be comprised by a three-dimensional digital dentition tooth model. For example, an identifier may be provided identifying the three-dimensional digital preparation model comprised by the three-dimensional digital dentition model. According to an example, the machine learning module may comprise a deep learning model.

For example, the generating of the three-dimensional digital restoration model comprises providing a three-dimensional digital artificial tooth model. The three-dimensional digital artificial tooth model defines a form of the prepared tooth to be restored using the dental restoration element. The three-dimensional digital preparation model is subtracted from the three-dimensional digital artificial tooth model. Thus, the three-dimensional digital artificial tooth model may define a target form to be achieved by arranging the dental restoration element on the prepared tooth.

For example, further comprises adjusting a tapering of the bottom section before the subtracting of the three-dimensional digital preparation model such that the adjusted bottom section comprises an adjusted constant preparation angle. The adjusted constant preparation angle is equal to a largest preparation angle of the bottom section before the adjusting.

Adjusting the preparation angle of the bottom section to be equal to a largest preparation angle of the bottom section before the adjusting may result in a three-dimensional digital restoration model to be used for the subtraction, which at least in some subsections of the bottom section is larger than the actual prepared tooth. Thus, a clearance between the prepared tooth and a dental restoration element defined using the three-dimensional digital tooth model with the adjusted preparation angle may be at least locally increased. This may ensure that the dental restoration element fits on the prepared tooth, while the larger clearance may be closed with additional adhesive, when fixating the dental prothesis on the prepared tooth. In particular irregularities of the preparation may thus be compensated. Furthermore, a manufacturing of the dental restoration element for a constant preparation angle may be simplified and less prone to errors.

For example, further comprises adjusting the tapering of the tapered bottom section before subtracting the three-dimensional digital preparation model such that the adjusted bottom section comprises an adjusted constant preparation angle. The adjusted constant preparation angle is equal to a largest preparation angle of the bottom section before the adjusting increased by a second predefined amount.

Adjusting the preparation angle of the bottom section to be equal to a largest preparation angle of the bottom section before the adjusting increased by the second predefined amount may result in a three-dimensional digital restoration model to be used for the subtraction, which comprises a bottom section that is over its entirety larger than the bottom section of the actual prepared tooth by at least the second predefined amount. Thus, a clearance between the prepared tooth and a dental restoration element defined using the three-dimensional digital tooth model with the adjusted preparation angle may be increased over the entire bottom section. This may ensure that the dental restoration element fits on the prepared tooth, while the larger clearance may be closed with additional adhesive, when fixating the dental prothesis on the prepared tooth. In particular irregularities of the preparation may thus be compensated over the entire bottom section. Furthermore, a manufacturing of the dental restoration element for a constant preparation angle may be simplified and less prone to errors.

For example, the method further comprises manufacturing the dental restoration element using the three-dimensional digital restoration model as a template. The manufactured dental restoration element is a physical copy of the respective template. Thus, a physical copy of the digital template in form of the three-dimensional digital restoration model may be provided. For example, arranging the manufactured dental restoration element on the prepared tooth may result in a form matching the target form for the preparation defined by the three-dimensional digital artificial tooth model.

For example, the dental restoration element being manufactured using one or more of the following: an additive method, a subtractive method. An additive method may, e.g., comprise 3D printing and/or casting. A subtractive method may, e.g., comprise machining.

For example, the dental restoration element may be manufactured using a machining device configured to manufacture the dental restoration element by processing a blank of restoration material. The resulting dental restoration element may be configured to be arranged on the prepared tooth resulting in a restored tooth with the target form as defined by three-dimensional digital artificial tooth model.

For example, the dental restoration element may be manufactured using a 3D printing device, i.e., a printer, configured to print the dental restoration element. The resulting dental restoration element may be configured to be arranged on the prepared tooth resulting in a restored tooth with the target form as defined by three-dimensional digital artificial tooth model.

For example, the three-dimensional digital restoration model may be used as a positive to define a negative of the physical dental restoration element in form of a negative three-dimensional digital restoration model. The negative three-dimensional digital restoration model may be used to manufacture, e.g., using machining or 3D printing, a casting matrix. The casting matrix may be configured for casting the physical dental restoration element by inserting restoration material into the casting matrix and curing the inserted restoration material. The resulting dental restoration element may be configured to be arranged on the prepared tooth resulting in a restored tooth with the target form as defined by three-dimensional digital artificial tooth model.

For example, the dental restoration element is a one of the following: a veneer, coping with coating, a crown, a partial crown, a bridge.

The dental restoration element may, e.g., be a dental restoration element comprising at last a section extending across at least a section of the bottom section down to a lower limit defined by the margin line or at least a section of the margin line.

A veneer is a layer of restoration material placed over a tooth, in order to cover one or more surfaces of the tooth. Veneers may, e.g., improve the aesthetics of a smile and/or protect the tooth's surface from damage. Indirect veneers are manufactured outside of a patient's oral cavity and then arranged on a tooth within the oral cavity. Direct veneers are built-up directly on a tooth inside a patient's oral cavity. The tooth may be prepared for receiving the veneer.

For example, two main types of restoration material may be used for manufacturing a veneer: composite and dental porcelain. A composite veneer may be directly placed on the tooth, i.e., built-up in the mouth of patient, or indirectly manufactured outside the mouth of the patient and later bonded to the tooth. In contrast, a porcelain veneer may only be indirectly manufactured outside the mouth of the patient. A full veneer crown, on the one hand, is dental restoration element that is configured to cover all the coronal tooth surfaces, i.e., the mesial, distal, facial, lingual and occlusal surfaces. A laminate veneer, on the other hand, is a thin layer of restoration material that may, e.g., cover only a single surface of a tooth, e.g., a labial surface. A laminate veneer may generally be used for aesthetic purposes.

Coping with coating refers to a dental restoration element, which is directly built on the tooth to be restored. An underlying coping is arranged on the tooth. The coping is configured to replicate the performance of a natural tooth. On the coping a coating is applied, which is configured to replicate the natural aesthetics of the tooth to be restored. For example, a ceramic coating may be used. Using a coping with coating to restore a tooth may have the beneficial effect of providing a dental restoration element that combines both durability and natural aesthetics.

A crown is a dental restoration element in form of a dental cap. Such a crown may, e.g., be provided in form of a full coverage crown or a partial crown. A full coverage crown completely caps or encircles a prepared tooth. A crown may, e.g., be required when a large cavity threatens the health of a tooth. A crown may be bonded to the tooth prepared for receiving the crown using a bonding material, e.g., a dental cement. A crown may be made from various materials, which may be fabricated using indirect methods, i.e., outside the patient's oral cavity. Crowns may be used to improve strength, to improve appearance of teeth and/or to halt deterioration.

A bridge is a dental restoration element in form of a permanent appliance used to replace one or more missing teeth. A dental bridge comprises a plurality of artificial dental elements that are fused together, e.g., one or more artificial replacement teeth are definitively joined to adjacent teeth. A conventional bridge may be supported, e.g., by full coverage crowns or partial crowns on the abutment teeth. The abutment teeth require preparation and reduction to support the bridge.

In another aspect a computer program product for closing one or more holes in a bottom section of a three-dimensional digital preparation model of a preparation of a tooth is disclosed. The tooth is prepared for receiving a dental restoration element with a lower limit of the bottom section of the preparation being prepared in form of a stepless edge. The computer program product comprises a computer readable storage medium having program instructions embodied therewith. The program instructions are executable by a processor of a computer device to cause the computer device to receive the three-dimensional digital preparation model of the prepared tooth. One or more holes of the three-dimensional digital preparation model to be closed are detected within the bottom section. A preparation angle used for preparing the bottom section is determined. The preparation angle is descriptive of an inclination of the bottom section relative to a vertical direction. The detected one or more holes are closed. The closing comprises an extrapolation of the bottom section into the holes using the determined preparation angle.

The program instructions provided by the computer program product may further be executable by the processor of the computer device to cause the computer device to execute any of the aforementioned examples of the method for closing the one or more holes in the bottom section of the three-dimensional digital preparation model of the preparation of the tooth.

In another aspect a computer program for closing one or more holes in a bottom section of a three-dimensional digital preparation model of a preparation of a tooth is disclosed. The tooth is prepared for receiving a dental restoration element with a lower limit of the bottom section of the preparation being prepared in form of a stepless edge. The computer program product comprises program instructions. The program instructions are executable by a processor of a computer device to cause the computer device to receive the three-dimensional digital preparation model of the prepared tooth. One or more holes of the three-dimensional digital preparation model to be closed are detected within the bottom section. A preparation angle used for preparing the bottom section is determined. The preparation angle is descriptive of an inclination of the bottom section relative to a vertical direction. The detected one or more holes are closed. The closing comprises an extrapolation of the bottom section into the holes using the determined preparation angle.

The program instructions provided by the computer program may further be executable by the processor of the computer device to cause the computer device to execute any of the aforementioned examples of the method for closing the one or more holes in the bottom section of the three-dimensional digital preparation model of the preparation of the tooth.

In another aspect a computer device for closing one or more holes in a bottom section of a three-dimensional digital preparation model of a preparation of a tooth is disclosed. The tooth is prepared for receiving a dental restoration element with a lower limit of the bottom section of the preparation being prepared in form of a stepless edge. The computer device comprises a processor and a memory storing program instructions executable by the processor. Execution of the program instructions by the processor causing the computer device to cause the computer device to receive the three-dimensional digital preparation model of the prepared tooth. One or more holes of the three-dimensional digital preparation model to be closed are detected within the bottom section. A preparation angle used for preparing the bottom section is determined. The preparation angle is descriptive of an inclination of the bottom section relative to a vertical direction. The detected one or more holes are closed. The closing comprises an extrapolation of the bottom section into the holes using the determined preparation angle.

Execution of the program instructions by the processor of the computer device may further cause the computer device to execute any of the aforementioned examples of the method for closing the one or more holes in the bottom section of the three-dimensional digital preparation model of the preparation of the tooth.

In another aspect a manufacturing system is disclosed, which comprises a computer device according to any of the aforementioned examples of a computer device. The manufacturing system further comprises one or more manufacturing devices configured to manufacture the dental restoration element. Execution of the program instructions by the processor further causes the computer device to control the manufacturing device to select a location for a margin line for the dental restoration element on the bottom section. One or more holes of the detected one or more holes to be closed extend across the selected location for the margin line. After the closing of the one or more holes to be closed, the margin line for the dental restoration element is defined at the selected location for the margin line on the bottom section across the one or more closed holes.

A three-dimensional digital restoration model of the dental restoration element to be arranged on the prepared tooth is generated using the three-dimensional digital preparation model and the margin line defined for the dental restoration element. The dental restoration element is manufactured using the three-dimensional digital restoration model as template. The manufactured dental restoration element is a physical copy of the respective template.

Execution of the program instructions by the processor of the computer device may further cause the computer device to execute any of the aforementioned examples of the method for manufacturing any of the aforementioned examples of the dental restoration element.

For example, the one or more manufacturing devices are one or more of the following devices: a machining device, a 3D printing device.

It is understood that one or more of the aforementioned embodiments may be combined as long as the combined embodiments are not mutually exclusive.

BRIEF DESCRIPTION OF THE DRAWINGS

In the following, examples are described in greater detail making reference to the drawings in which.

DETAILED DESCRIPTION

Figure 1:
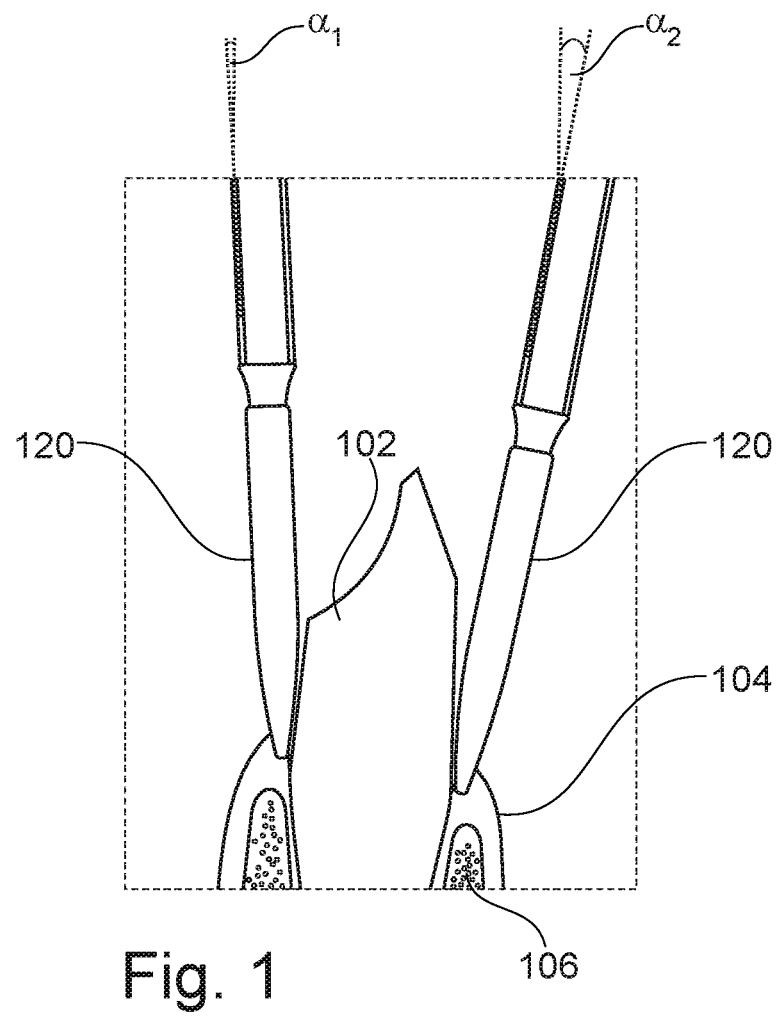
FIG. 1 shows an exemplary prepared tooth.

In the following, similar elements are denoted by the same reference numerals. Elements which have been discussed previously will not necessarily be discussed in later figures if the function is equivalent.

FIG. 1 shows an exemplary preparation of a tooth 102 using a tapered bur 120. The preparation resulting from the usage of the tapered bur 120 may, e.g., be a preparation with a stepless edge, e.g., a stepless feather edge. A prepared bottom section of the preparation of the prepared tooth 102 extends below a level of a gingiva contour line defined by a gingiva 104 surrounding the prepared tooth 102. A preparation angle may, e.g., depend on a taper angle of the tapered bur 120 and an inclination angle of the tapered bur 120 used, when preparing the tooth 102. In FIG. 1 two different exemplary inclination angles are shown $\alpha_1$ and $\alpha_2$. The prepared bottom section may, e.g., be tapered in a coronal direction. For example, a taper angle of the tapered bottom section may be used as a preparation angle for closing holes occurring within a bottom section of a three-dimensional preparation model of the prepared tooth 102.

Figure 2:
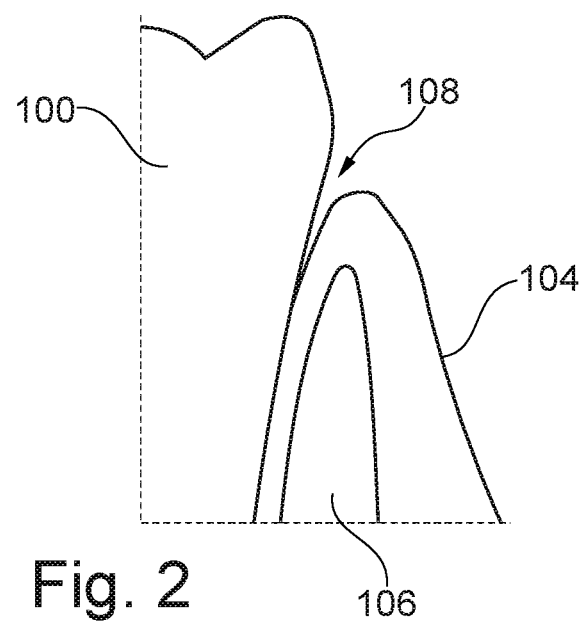
FIG. 2 shows an exemplary gingival sulcus.

FIG. 2 shows an exemplary tooth 100, which is surrounded by a gingiva 104. The gingiva 104 is arranged on the alveolar bone 106. Between the tooth 100 and gingiva 104, the gingival sulcus 108 extends circumferentially around the tooth 100. In order to hide a lower limit of a dental restoration, like a crown, the lower limit may be arranged below a level of a gingiva contour line defined by the gingiva 104 within the gingival sulcus 108.

Figure 3:
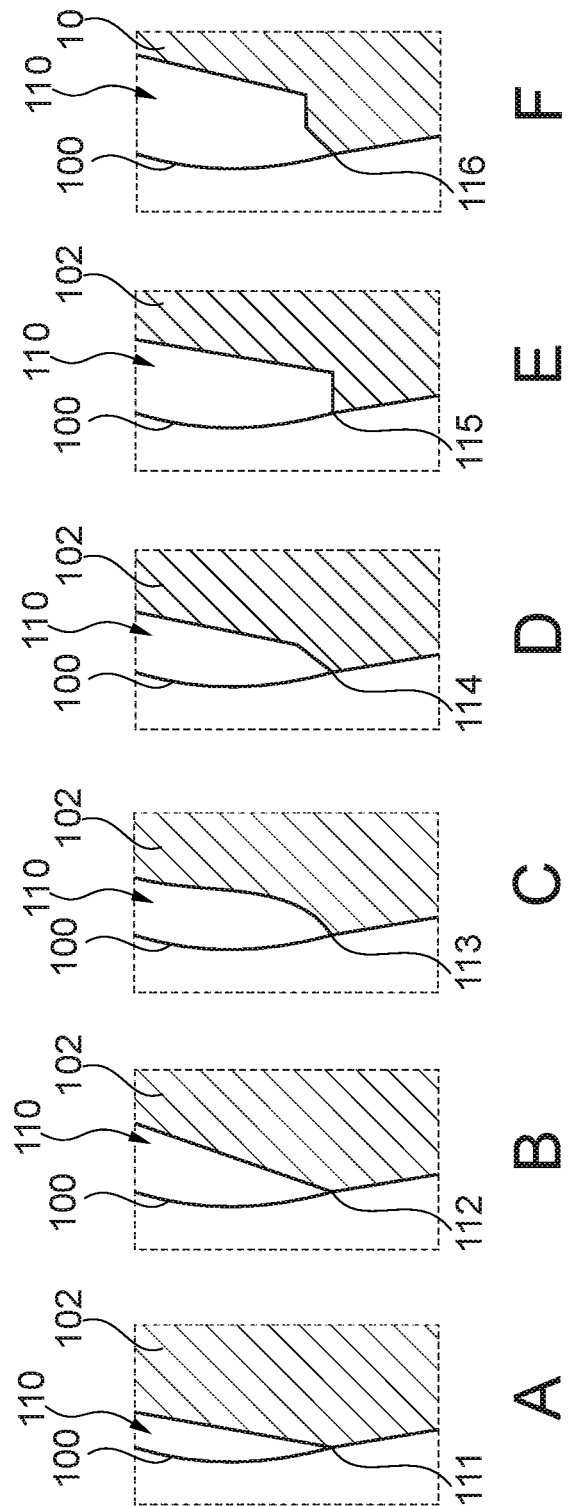
FIG. 3 shows exemplary preparations edges.

FIG. 3 shows different exemplary types of preparation edges, stepless edges as well as edges comprising a step. FIG. 3 comprises six schematic illustrations A to F of exemplary preparation edges. Illustration A shows an exemplary preparation 110 of a tooth 100 resulting in a prepared tooth 102 comprising a feather edge 111. The feather edge 111 is a stepless edge. Illustration B shows an exemplary preparation 110 of a tooth 100 resulting in a prepared tooth 102 comprising a knife edge 112. The knifer edge 112 may as well be considered a stepless edge. All the other edges 113 to 116 of FIG. 3 are not stepless, but rather result in a detectable step. Illustration C shows an exemplary preparation 110 of a tooth 100 resulting in a prepared tooth 102 comprising a chamfer edge 113. Illustration D shows an exemplary preparation 110 of a tooth 100 resulting in a prepared tooth 102 comprising a bevel edge 114. Illustration E shows an exemplary preparation 110 of a tooth 100 resulting in a prepared tooth 102 comprising a shoulder edge 115. Illustration F shows an exemplary preparation 110 of a tooth 100 resulting in a prepared tooth 102 comprising a beveled shoulder edge 116.

Figure 4:
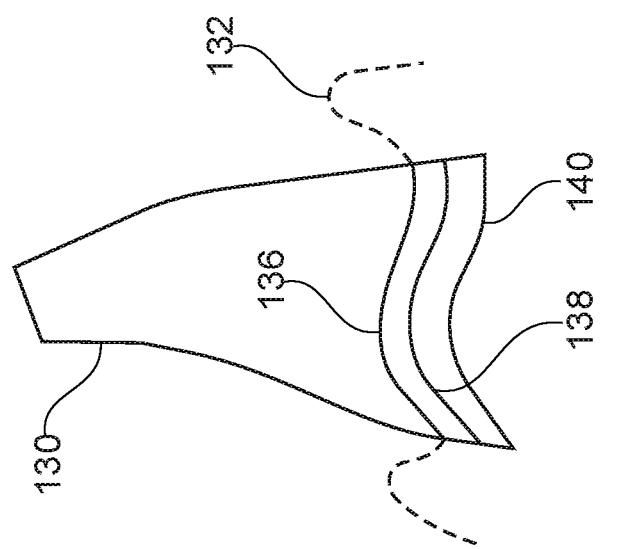
FIG. 4 shows an exemplary three-dimensional preparation model.

FIG. 4 shows a three-dimensional digital preparation model 130 of a prepared tooth. Furthermore, a three-dimensional digital gingiva model 132 of a gingiva surrounding the prepared tooth. A projected gingiva contour line 136 of an upper edge of the three-dimensional digital gingiva model 132 projected onto a bottom section 134 of the three-dimensional digital preparation model 130 defines a gingival height. Below the projected gingiva contour line 136, e.g., in a predefined first distance, is a margin line 138 defined. The margin line 138 defines a lower limit of a dental restoration element to be arranged on the prepared tooth. In an apical direction, the three-dimensional digital preparation model 130 may, e.g., extend down to a bottom line 140 defining a lower limit of the three-dimensional digital preparation model 130. In case the bottom section 134 of the three-dimensional digital preparation model 130 comprises any holes, in particular holes preventing a definition of any of the projected gingiva contour line 136, the margin line 138 and/or the bottom line 140, the holes may be closed using a preparation angle of the preparation.

Figure 5:
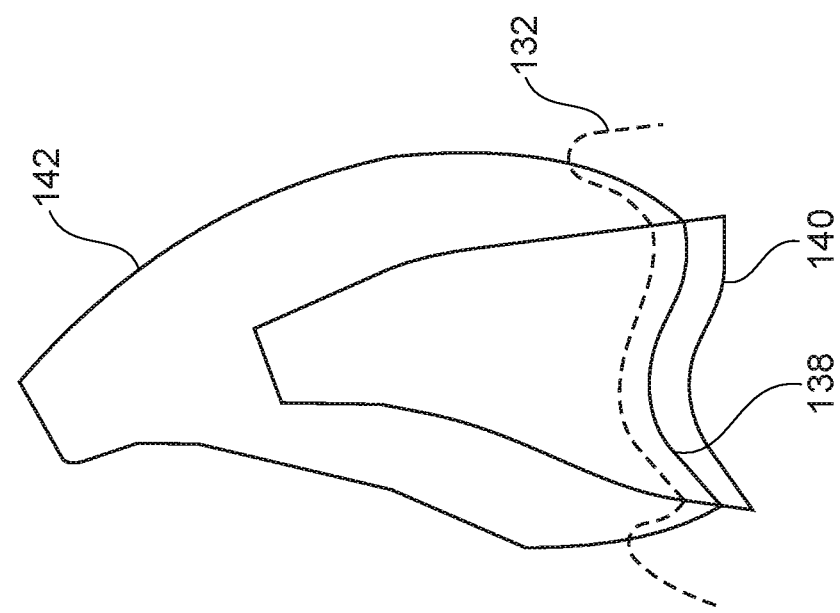
FIG. 5 shows an exemplary three-dimensional artificial tooth model.

FIG. 5 shows a three-dimensional digital artificial tooth model 142 superposed with the three-dimensional digital preparation model 130. The three-dimensional digital artificial tooth model 142 may, e.g., be adjusted to extend down to the margin line 138 below the projected gingiva contour line 136. The three-dimensional digital artificial tooth model 142 may be used to generate a three-dimensional digital restoration model of a restoration element.

Figure 6:
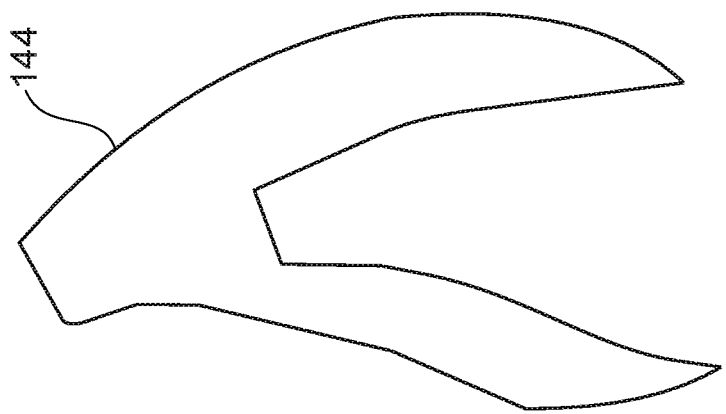
FIG. 6 shows an exemplary three-dimensional restoration model.

FIG. 6 shows a three-dimensional digital restoration model 144 of a dental preparation element to be arranged on the prepared tooth to restore the same. The three-dimensional digital restoration model 144 may, e.g., be generated by subtracting the three-dimensional digital preparation model 130 of FIG. 5 from the three-dimensional digital artificial tooth model 142 of FIG. 5.

Figure 7:
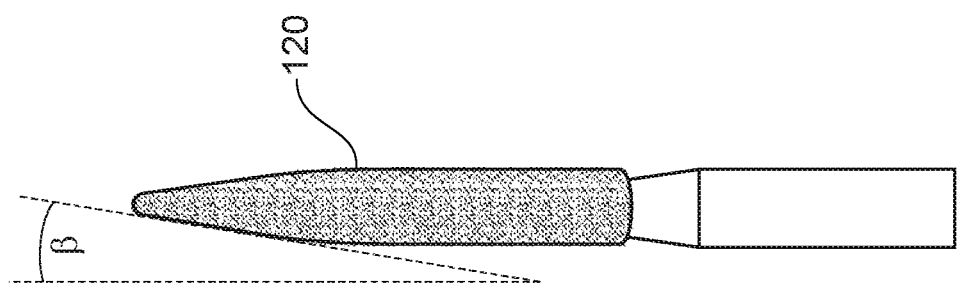
FIG. 7 shows an exemplary tapered bur.

FIG. 7 shows an exemplary tapered bur 120. A tapering of the tapered bur 120 is defined by a taper angle $\beta$. Using the tapered bur 120 for preparing a bottom section of a prepared tooth may result in a bottom section tapered in a coronal direction. A preparation angle of the bottom section, in case of a tapered bottom section a taper angle, may depend on the taper angle $\beta$ of the tapered bur 120 and/or on an inclination angle used, when preparing the bottom section.

Figure 8:
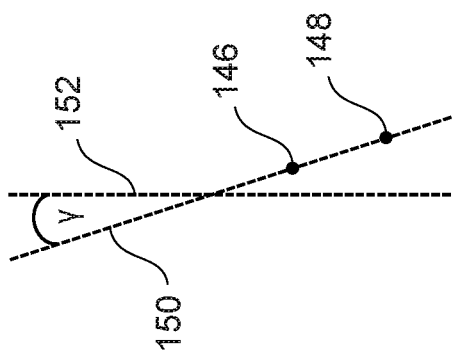
FIG. 8 shows an exemplary preparation angle.

FIG. 8 shows an exemplary preparation angle $\gamma$ defined using a first point 146 arranged within the bottom section of the three-dimensional digital preparation model and a second point 148 arranged in apical direction below the first point 146 within the bottom section of the three-dimensional digital preparation model. First point 146 and second point 148 are intersected by a straight line 150. The preparation angle $\gamma$ may be defined as an angle between straight line 150 and a reference line 152, e.g., a vertical line.

Figure 9:
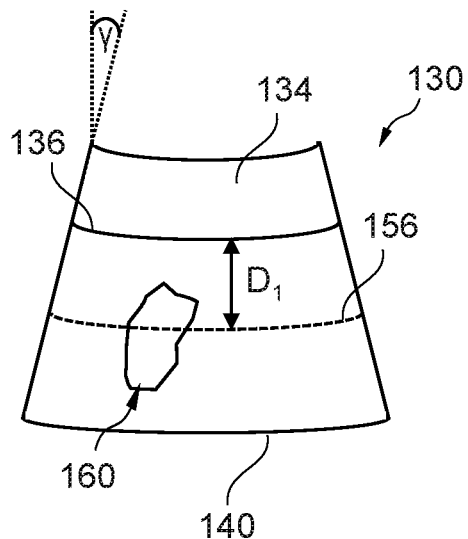
FIG. 9 shows an exemplary bottom sections of three-dimensional preparation model comprising holes.
Figure 9:
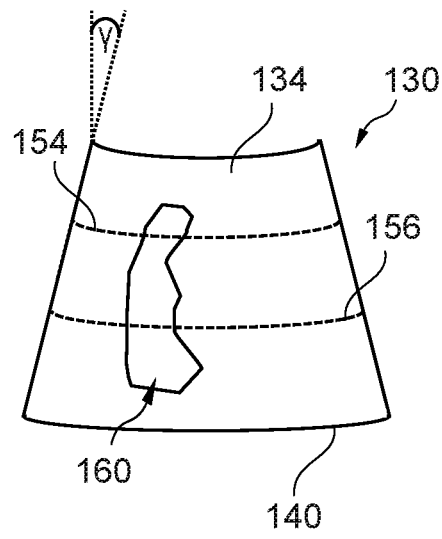
Figure 9:
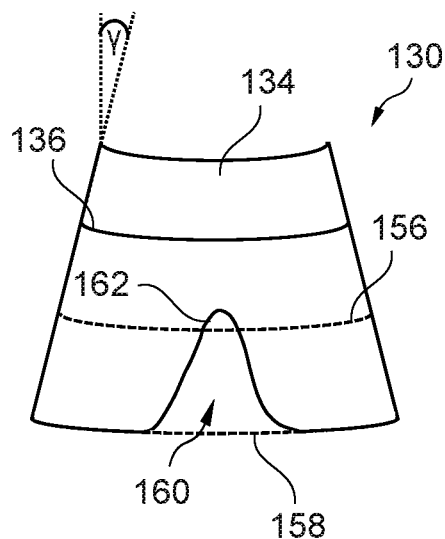
Figure 9:
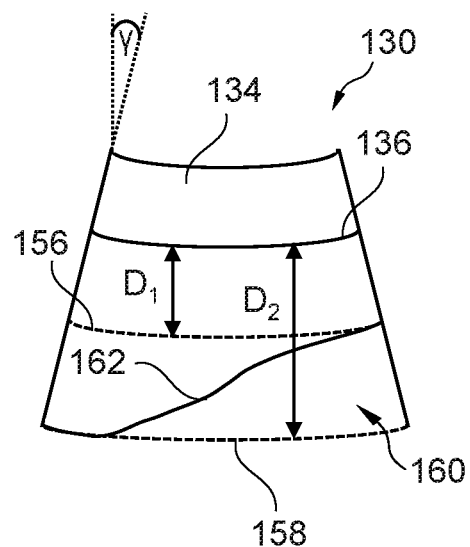

FIG. 9 shows exemplary holes 160 extending within a bottom section 134 of a three-dimensional digital preparation model 130. In FIG. 9 four exemplary holes 160 extending within a bottom section 134 of a three-dimensional digital preparation model 130 shown in four schematic illustrations A to D. In illustration A, hole 160 extends over a location 156 selected for defining a margin line between a projected gingiva contour line 136 on a bottom line 140. The location 156 for the margin line is selected, e.g., in a first predefined distance $D_1$ below the projected gingiva contour line 136. In order to be able to define a margin line on the bottom section 134 at location 156, hole 160 has to be closed, e.g., with an extrapolation of the bottom section 134 using a preparation angle $\gamma$ of the bottom section 134. For example, the bottom section 134 may be tapered in coronal direction with the taper angle being the preparation angle $\gamma$.

In illustration B, hole 160 extends over the location 156 selected for defining a margin line as well as a location 154, on which the gingiva contour line is to be projected. In order to be able to project the gingiva contour line onto bottom section 134 at location 154 and to define a margin line on bottom section 134 at location 156, hole 160 has to be closed, e.g., with an extrapolation of the bottom section 134 using a preparation angle $\gamma$ of the bottom section 134. For example, the bottom section 134 may be tapered in coronal direction with the taper angle being the preparation angle $\gamma$.

In illustration C, hole 160 is open at a bottom and formed by a lower boundary 162 of bottom section 134. Hole 160 extends in coronal direction into bottom section 134 and over a location 156 selected for defining a margin line. In order to be able to define a margin line on the bottom section 134 at location 156, hole 160 has to be closed, e.g., with an extrapolation of the bottom section 134 using a preparation angle γ of the bottom section 134. For example, the bottom section 134 may be tapered in coronal direction with the taper angle being the preparation angle γ. For closing hole 160, the bottom section 134 may be extended down in apical direction to a location 158 of bottom line defined for the extended bottom section 134.

In illustration D, hole 160 is open at a bottom and formed by a lower boundary 162 of bottom section 134. Hole 160 extends in coronal direction into bottom section 134 and over a location 156 selected for defining a margin line. Hole 160 shown in illustration D is, e.g., larger than hole 160 shown in illustration C. In order to be able to define a margin line on the bottom section 134 at location 156, hole 160 has to be closed, e.g., with an extrapolation of the bottom section 134 using a preparation angle γ of the bottom section 134. The location 156 for the margin line is selected, e.g., in a first predefined distance $D_1$ below the projected gingiva contour line 136. The location 158 for the bottom line is selected, e.g., in a second predefined distance $D_2$ below the projected gingiva contour line 136. For example, the bottom section 134 may be tapered in coronal direction with the taper angle being the preparation angle γ. For closing hole 160, the bottom section 134 may be extended down in apical direction to a location 158 of bottom line defined for the extended bottom section 134.

Figure 10:
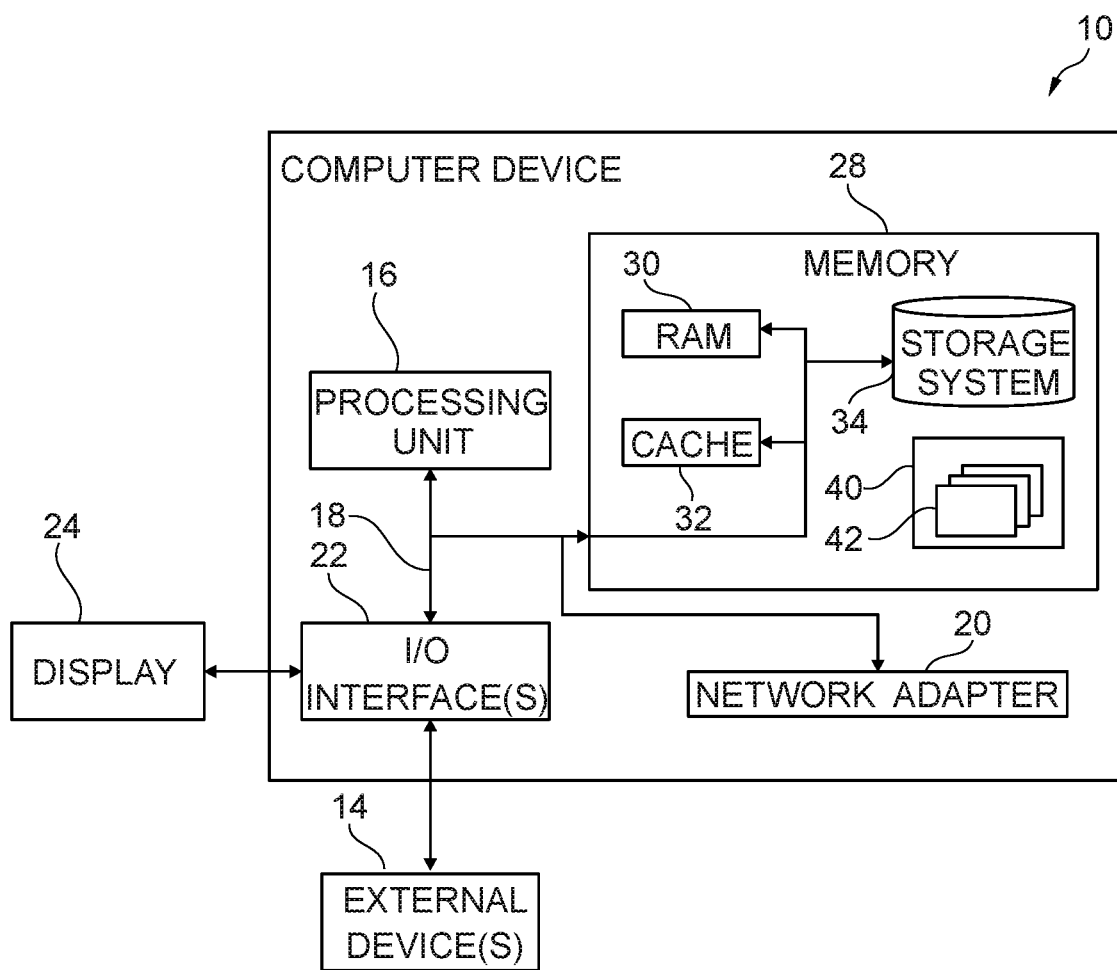
FIG. 10 shows an exemplary computer device for closing holes of a three-dimensional digital preparation model.

FIG. 10 shows a schematic diagram of an exemplary computer device 10 for closing one or more holes in a bottom section of a three-dimensional digital preparation model of a preparation of a tooth. The computer device 10 may be operational with numerous other general-purpose or special-purpose computing system environments or configurations. Computer device 10 may be described in the general context of computer device executable instructions, such as program modules comprising executable program instructions, being executable by the computer device 10. Generally, program modules may include routines, programs, objects, components, logic, data structures, and so on that perform particular tasks or implement particular abstract data types. Computer device 10 may be practiced in distributed computing environments where tasks are performed by remote processing devices that are linked through a communications network. In a distributed computing environment, program modules may be located in both local and remote computer device storage media including memory storage devices.

In FIG. 10, computer device 10 is shown in the form of a general-purpose computing device. The components of computer device 10 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 10 may comprise a variety of computer device readable storage media. Such media may be any available storage media accessible by computer device 10, and include both volatile and non-volatile storage media, removable and non-removable storage media.

A system memory 28 may include computer device readable storage media in the form of volatile memory, such as random-access memory (RAM) 30 and/or cache memory 32. Computer device 10 may further include other removable/non-removable, volatile/non-volatile computer device storage media. For example, storage system 34 may be provided for reading from and writing to a non-removable, non-volatile magnetic media also referred to as a hard drive. For example, a magnetic disk drive for reading from and writing to a removable, non-volatile magnetic disk, e.g., a floppy disk, and an optical disk drive for reading from or writing to a removable, non-volatile optical disk such as a CD-ROM, DVD-ROM or other optical storage media may be provided. In such instances, each storage medium may be connected to bus 18 by one or more data media interfaces. Memory 28 may, e.g., include the three-dimensional digital preparation model of the preparation of a tooth, i.e., the prepared tooth. The tooth is prepared for receiving a dental restoration element with a lower limit of the bottom section of the preparation being prepared in form of a stepless edge. The three-dimensional digital gingiva model may, e.g., be comprised by a three-dimensional digital dentition model or may be provided on its own. Memory 28 may, e.g., include a three-dimensional digital gingiva model of a gingiva surrounding the prepared tooth. The three-dimensional digital gingiva model may, e.g., be comprised by a three-dimensional digital dentition model or may be provided on its own.

Memory 28 may, e.g., include scan data of a patient's mouth from an intraoral scan or from a scan of a classical mold/impression, e.g., providing information about the surface structure of the patient's intraoral tissue comprising teeth and the gingiva. The scan data may comprise scan data of the prepared tooth and/or the gingiva surrounding the prepared tooth.

Memory 28 may, e.g., include a three-dimensional digital artificial tooth model. The three-dimensional digital artificial tooth model defines a target form to be achieved by arranging a dental restoration element on the prepared tooth. Memory 28 may, e.g., include a digital tooth library providing a plurality of three-dimensional digital library tooth models. This digital tooth library may be used for providing the three-dimensional digital artificial tooth model in form of a three-dimensional digital library tooth model selected from the digital tooth library.

Memory 28 may, e.g., include a trained machine learning module configured to provide the three-dimensional digital artificial tooth model as output in response to receiving the three-dimensional digital tooth model as input. The trained machine learning module may, e.g., have been received by the computer device 10. The trained machine learning module may, e.g., have been trained by the computer device 10 using training datasets with training data received and/or generated by the computer device 10. For training the machine learning module, the memory 28 may comprise a machine learning module to be trained as well as training datasets with training data for training the machine learning module to provide a three-dimensional digital artificial tooth model. The machine learning module included in memory 28 for providing the three-dimensional digital artificial tooth model may, e.g., be an untrained machine learning module, a pre-trained machine learning module or a partially trained machine learning module.

Program 40 may have a set of one or more program modules 42 and by way of example be stored in memory 28. The program modules 42 may comprise an operating system, one or more application programs, other program modules, and/or program data. Each of these program modules 42, i.e., the operating system, the one or more application programs, the other program modules, and/or the program data or some combination thereof, may include an implementation of a networking environment. One or more of the program modules 42 may be configured for closing one or more holes in a bottom section of a three-dimensional digital preparation model of a preparation of a tooth. One of the program modules 42 may, e.g., further be configured for providing and/or generating a three-dimensional digital artificial tooth model. One of the program modules 42 may, e.g., be configured to train a machine learning module to be trained. The machine learning module to be trained may, e.g., be an untrained machine learning module, a pre-trained machine learning module or a partially trained machine learning module. One of the program modules 42 may, e.g., further be configured for generating a three-dimensional digital restoration model.

Computer device 10 may further communicate with one or more external devices 14 such as a keyboard, a pointing device, like a mouse, and a display 24 enabling a user to interact with computer device 10. Such communication can occur via input/output (I/O) interfaces 22. Computer device 10 may further communicate with one or more networks such as a local area network (LAN), a general wide area network (WAN), and/or a public network, like the Internet, via network adapter 20. Network adapter 20 may communicate with other components of computer device 10 via bus 18. It should be understood that although not shown, other hardware and/or software components could be used in conjunction with computer device 10.

The computer device 10 shown in FIG. 10 may be configured for closing one or more holes in a bottom section of a three-dimensional digital preparation model of a preparation of a tooth. The tooth is prepared for receiving a dental restoration element with a lower limit of the bottom section of the preparation being prepared in form of a stepless edge. The method comprises receiving the three-dimensional digital preparation model of the prepared tooth. One or more holes of the three-dimensional digital preparation model to be closed are detected within the bottom section. A preparation angle used for preparing the bottom section is determined. The preparation angle is descriptive of an inclination of the bottom section relative to a reference direction. The detected one or more holes are close. The closing comprises an extrapolation of the bottom section into the holes using the determined preparation angle. Furthermore, computer device 10 shown in FIG. 10 may, e.g., be configured for selecting a location for defining a margin line for the dental restoration element on the bottom section. One or more holes of the detected one or more holes to be closed extend across the selected location for the margin line. After the closing of the one or more holes to be closed, the margin line for the dental restoration element is defined at the selected location for the margin line on the bottom section across the one or more closed holes. Furthermore, e.g., a three-dimensional digital gingiva model of a gingiva surrounding the prepared tooth may be received. A horizontal gingiva contour line of a top edge of the three-dimensional digital gingiva model is projected onto the bottom section of the three-dimensional digital preparation model. The projected gingiva contour line extends circumferentially around the bottom section. The location for the margin line on the bottom section selected in a first predefined distance below the projected gingiva contour line. For example, the closing of the one or more holes comprises extending the bottom section in an apical direction of the prepared tooth. Furthermore, a bottom line below the projected gingiva contour line may, e.g., be defined. The bottom line extends circumferentially around the bottom section. The bottom section is extended in the apical direction down to the bottom line.

Furthermore, computer device 10 shown in FIG. 10 may, e.g., be configured for generating a three-dimensional digital restoration model of the dental restoration element to be arranged on the prepared tooth using the three-dimensional digital preparation model and the margin line defined for the dental restoration element. The generating a three-dimensional digital restoration model may be used for manufacturing the dental restoration element. The manufactured dental restoration element is a physical copy of the respective template. For manufacturing the dental restoration element, e.g., additive methods, like 3D printing and/or casting, may be used. Alternatively or additionally, subtractive methods, e.g., comprises machining, may be used.

Figure 11:
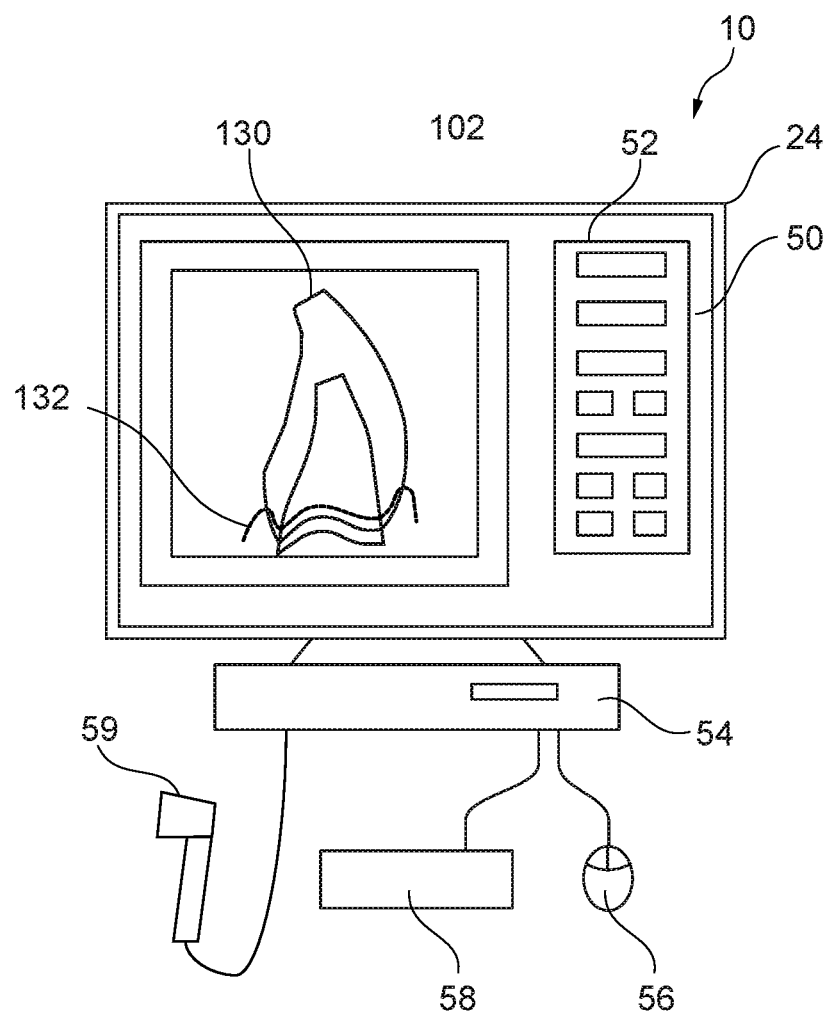
FIG. 11 shows an exemplary computer device for closing holes of a three-dimensional digital preparation model.

FIG. 11 shows an exemplary computer device 10 for closing one or more holes in a bottom section of a three-dimensional digital preparation model of a preparation of a tooth. The computer device 10 may, e.g., be configured as shown in FIG. 10. The computer device 10 may comprise a hardware component 54 comprising one or more processors as well as a memory storing machine-executable program instructions. Execution of the program instructions by the one or more processors may cause the one or more processors to control the computer device 10 to close the one or more holes in the bottom section of the three-dimensional digital preparation model.

The computer device 10 may further comprise one or more input devices, like a keyboard 58 and a mouse 56, enabling a user to interact with the computer device 10. Furthermore, the computer device 10 may comprise one or more output devices, like a display 24 providing a graphical user interface 50 with control elements 52, e.g., GUI elements, enabling the user to control the closing of holes in the bottom section of the three-dimensional digital preparation model 130. The computer device 10 may further comprise an intraoral scanner 59, e.g., configured for scanning a patient's oral cavity, an impression of a patient's oral cavity and/or a positive of a patient's oral cavity generated using an impression.

Figure 12:
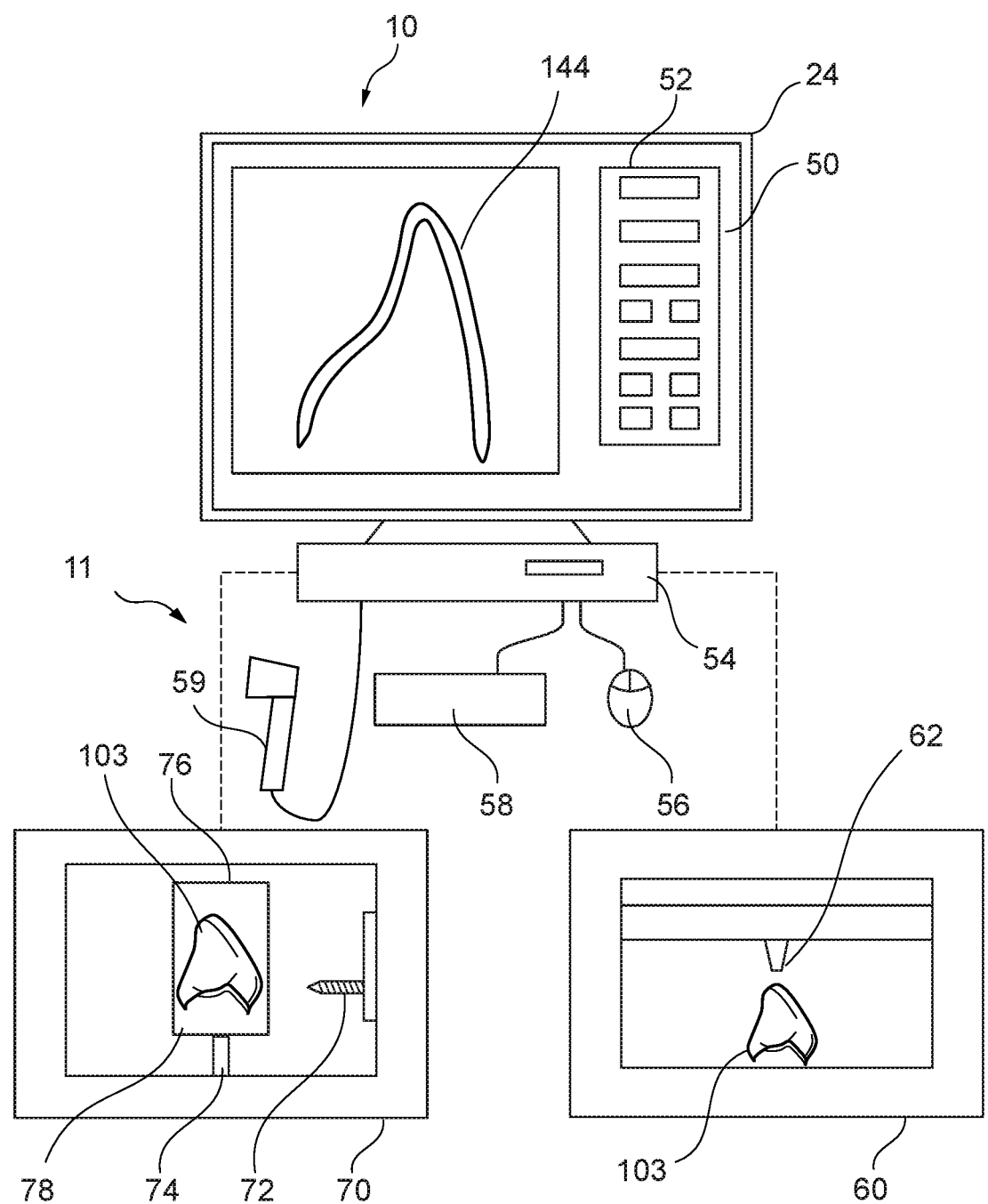
FIG. 12 shows an exemplary system for manufacturing a dental restoration element.

FIG. 12 shows an exemplary manufacturing system 11 for manufacturing a dental restoration element. A three-dimensional digital restoration model defining a dental restoration element to be arranged on the prepared tooth may be provided. For providing the three-dimensional digital restoration model the three-dimensional digital preparation model with closed holes and the margin line defined for the dental restoration element may be used. This three-dimensional digital restoration model may, e.g., be used as a template for manufacturing the dental restoration element as a physical copy of the template.

The manufacturing system 11 may comprise the computer device 10 of FIG. 11. The computer device 10 may further be configured to control one or more manufacturing devices 60, 70. For example, the manufacturing system 11 may comprise a manufacturing device in form of a machining device 70 controlled by the computer device 10. The machining device 70 may be configured to machining a blank 76 using one or more machining tools 72. The blank 76 of raw material 78, may be provided using a holding device 74 and cut into a desired shape and size of the element to be manufactured, e.g., the dental restoration element 103. The machining tool 72 may, e.g., be a milling tool.

For example, the manufacturing system 11 may comprise a manufacturing device in form of a 3D printing device 60. The 3D printing device 60 may be controlled by the computer device 10 and configured to print an element to be manufactured, e.g., the dental restoration element 103. The 3D printing device 60 may comprise a printing element 62 configured to print the respective element, like the dental restoration element, layer by layer. The printing element 62 may, e.g., comprise a nozzle configured for distributing printing material.

In case the element to be manufactured using the 3D printing device 60 is made using metal, the 3D printing device 60 may, e.g., be configured for executing selective laser sintering or melting. Selective laser sintering uses a laser for sintering a powdered material, aiming the laser automatically at points in space defined by a three-dimensional digital model of the element to be printed. The laser energy may result in a local sintering or melting of the powdered material, binding the material together to create a solid structure. For example, the printing element 62 of the 3D printing device 60 may comprise a laser and/or a distributing device for distributing the powdered material.

For example, the three-dimensional digital restoration model 144 may be used as a positive to define a negative of the physical dental restoration element in form of a negative three-dimensional digital restoration model. The negative three-dimensional digital restoration model may be used to manufacture, e.g., using machining device 70 or 3D printing device 60, a casting matrix. The casting matrix may be configured for casting the physical dental restoration element 103 by inserting restoration material into the casting matrix and curing the inserted restoration material.

Figure 13:
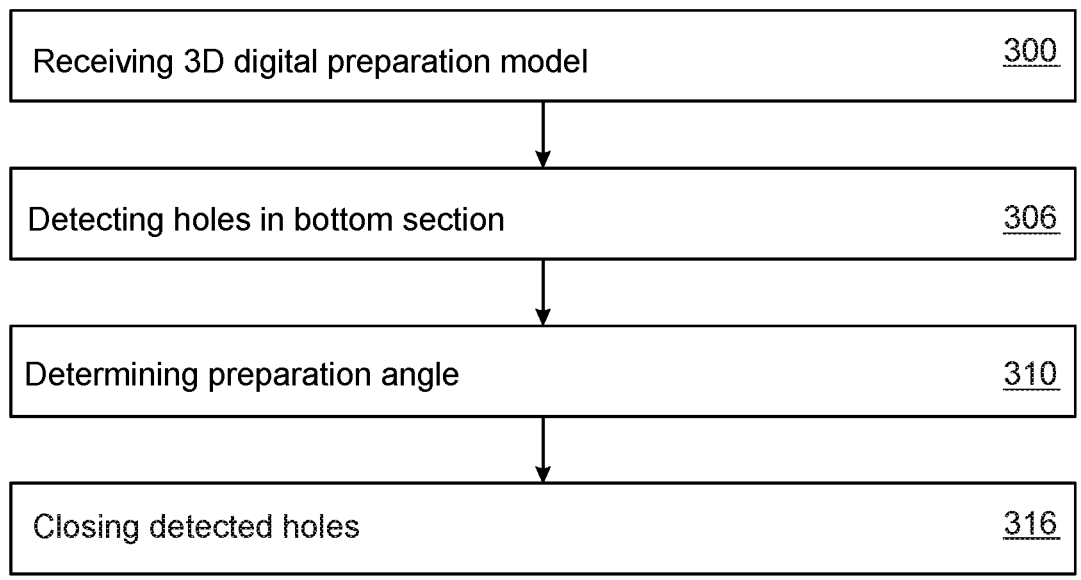
FIG. 13 shows a flowchart illustrating an exemplary method for closing holes of a three-dimensional digital preparation model.

FIG. 13 shows an exemplary method for closing one or more holes in a bottom section of a three-dimensional digital preparation model of a preparation of a tooth. The tooth is prepared for receiving a dental restoration element with a lower limit of the bottom section of the preparation being prepared in form of a stepless edge. For example, the stepless edge may be stepless feather edge or a stepless knife edge.

In block 300, the three-dimensional digital preparation model of the prepared tooth is received.

The three-dimensional digital preparation model of the prepared tooth is descriptive of a form, i.e., a current state, of the prepared tooth. The three-dimensional digital preparation model may be provided using scan data of the respective prepared tooth of the patient acquired using a scanner, e.g., an optical scanner. The scan may be a direct scan of the prepared tooth, e.g., an intraoral scan. Alternatively or additionally, an indirect scan of the prepared tooth may be used to acquire the scan data. For example, a dental impression of the prepared tooth or a dental model of the prepared, like a plaster model or a silicone model, may be scanned.

For example, the scan data of the prepared tooth may be comprised by scan data of a patient's dentition comprising the prepared tooth. The scan data of the dentition may be acquired using a scanner, e.g., an optical scanner. The scan may be a direct scan of the patient's dentition, e.g., an intraoral scan. Alternatively or additionally, an indirect scan of the patient's dentition may be used to acquire the scan data. For example, a dental impression of the patient's dentition or a dental model of the dentition, like a plaster model or a silicone model, may be scanned.

The three-dimensional digital preparation model may, e.g., be provided as part of a three-dimensional digital dentition model of the dentition of the patient. The three-dimensional digital dentition model of the dentition of the patient may be provided using scan data of the patient's dentition. The three-dimensional digital preparation model may be identified within the three-dimensional digital dentition model of the dentition of the patient using segmentation.

The three-dimensional digital preparation model may be a three-dimensional digital model of a current state of the prepared tooth. This three-dimensional digital preparation model as a current state model of the prepared tooth may resemble an actual state of the prepared tooth, i.e., it may be a digital replica of the prepared physical tooth. The three-dimensional digital preparation model may, in particular, resemble the geometric form of the prepared tooth. The three-dimensional digital preparation model may, e.g., be generated by the computer system executing the method using scan data of the prepared tooth or it may be received from an external source. The external source may, e.g., be a server, like a cloud server, providing the three-dimensional digital preparation model via a network. The external source may, e.g., be a removable storage device providing the three-dimensional digital preparation model via a direct communication connection, e.g., wireless or via a wire.

The three-dimensional digital preparation model may be provided as part of a three-dimensional digital dentition model of the dentition of the patient. The three-dimensional digital dentition model may be a three-dimensional digital model of a current state the dentition. This three-dimensional digital dentition model may be generated using the scan data of a direct and/or indirect scan of the dentition. The three-dimensional digital dentition model as a current state model of the respective dentition may resemble an actual state of the patient's dentition, i.e., it may be a digital replica of the physical dentition. The three-dimensional digital dentition model of the respective tooth may, in particular, resemble the geometric form of the physical dentition as well as the relative positions of the teeth comprised by the dentition. The three-dimensional digital dentition model may be generated by the computer system or it may be received from an external source. The external source may, e.g., be a server, like a cloud server, providing the three-dimensional digital dentition model via a network. The external source may, e.g., be a removable storage device providing the three-dimensional digital dentition model via a direct communication connection, e.g., wireless or via a wire.

In block 306, one or more holes of the three-dimensional digital preparation model to be closed within the bottom section are detected. These holes may, e.g., result from incomplete and/or erroneous scan data of the prepared tooth.

In block 310, a preparation angle used for preparing the bottom section is determined. The preparation angle is descriptive of an inclination of the bottom section relative to a reference direction.

In block 314, the detected one or more holes are closed. The closing comprises an extrapolation of the bottom section into the holes using the determined preparation angle.

Figure 14:
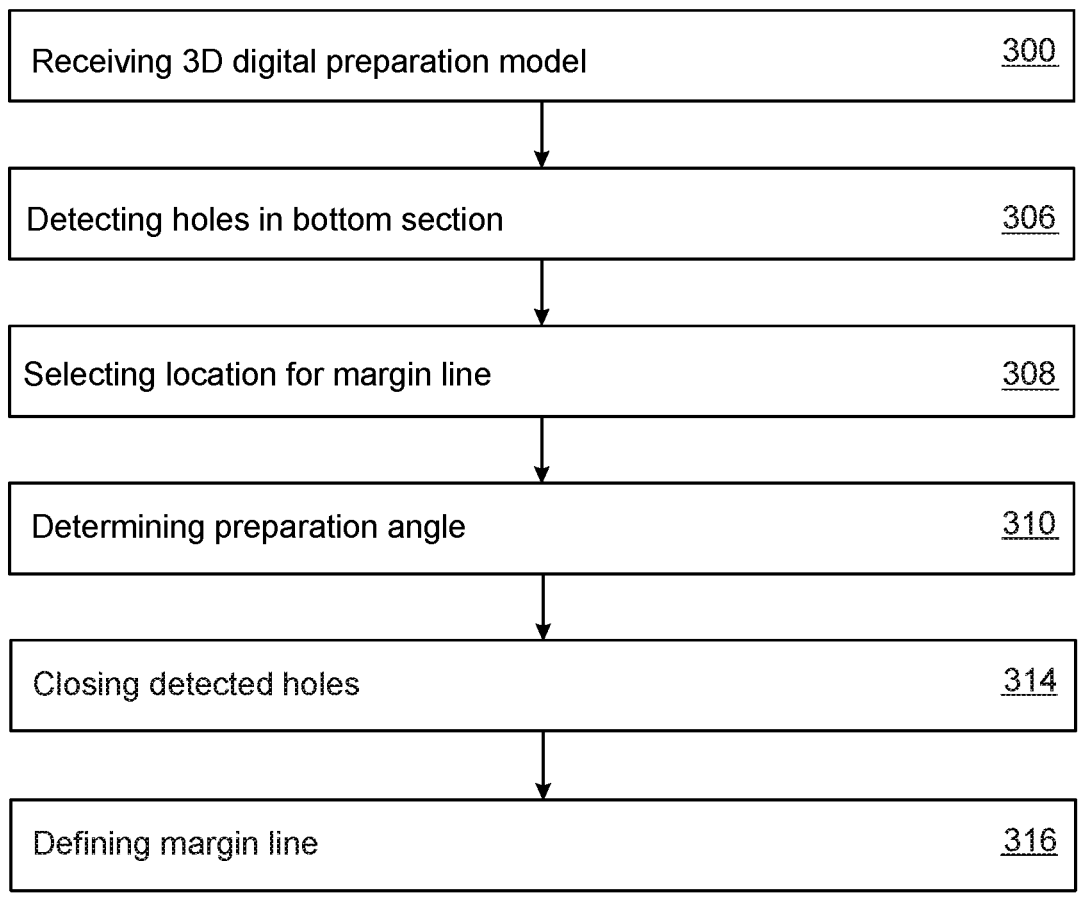
FIG. 14 shows a flowchart illustrating an exemplary method for defining a margin line.

FIG. 14 shows an exemplary method for closing one or more holes in a bottom section of a three-dimensional digital preparation model of a preparation of a tooth. The three-dimensional digital preparation model with closed holes is used for providing a margin line on the bottom section, which is defines a lower limit of a dental restoration element to be arranged on the prepared tooth, in order to restore the same. The tooth is prepared for receiving a dental restoration element with a lower limit of the bottom section of the preparation being prepared in form of a stepless edge. For example, the stepless edge may be stepless feather edge or a stepless knife edge.

In block 300, the three-dimensional digital preparation model of the prepared tooth is received.

The three-dimensional digital preparation model of the prepared tooth is descriptive of a form, i.e., a current state, of the prepared tooth. The three-dimensional digital preparation model may be provided using scan data of the respective prepared tooth of the patient acquired using a scanner, e.g., an optical scanner. The scan may be a direct scan of the prepared tooth, e.g., an intraoral scan. Alternatively or additionally, an indirect scan of the prepared tooth may be used to acquire the scan data. For example, a dental impression of the prepared tooth or a dental model of the prepared, like a plaster model or a silicone model, may be scanned.

For example, the scan data of the prepared tooth may be comprised by scan data of a patient's dentition comprising the prepared tooth. The scan data of the dentition may be acquired using a scanner, e.g., an optical scanner. The scan may be a direct scan of the patient's dentition, e.g., an intraoral scan. Alternatively or additionally, an indirect scan of the patient's dentition may be used to acquire the scan data. For example, a dental impression of the patient's dentition or a dental model of the dentition, like a plaster model or a silicone model, may be scanned.

The three-dimensional digital preparation model may, e.g., be provided as part of a three-dimensional digital dentition model of the dentition of the patient. The three-dimensional digital dentition model of the dentition of the patient may be provided using scan data of the patient's dentition. The three-dimensional digital preparation model may be identified within the three-dimensional digital dentition model of the dentition of the patient using segmentation.

The three-dimensional digital preparation model may be a three-dimensional digital model of a current state of the prepared tooth. This three-dimensional digital preparation model as a current state model of the prepared tooth may resemble an actual state of the prepared tooth, i.e., it may be a digital replica of the prepared physical tooth. The three-dimensional digital preparation model may, in particular, resemble the geometric form of the prepared tooth. The three-dimensional digital preparation model may, e.g., be generated by the computer system executing the method using scan data of the prepared tooth or it may be received from an external source. The external source may, e.g., be a server, like a cloud server, providing the three-dimensional digital preparation model via a network. The external source may, e.g., be a removable storage device providing the three-dimensional digital preparation model via a direct communication connection, e.g., wireless or via a wire.

The three-dimensional digital preparation model may be provided as part of a three-dimensional digital dentition model of the dentition of the patient. The three-dimensional digital dentition model may be a three-dimensional digital model of a current state the dentition. This three-dimensional digital dentition model may be generated using the scan data of a direct and/or indirect scan of the dentition. The three-dimensional digital dentition model as a current state model of the respective dentition may resemble an actual state of the patient's dentition, i.e., it may be a digital replica of the physical dentition. The three-dimensional digital dentition model of the respective tooth may, in particular, resemble the geometric form of the physical dentition as well as the relative positions of the teeth comprised by the dentition. The three-dimensional digital dentition model may be generated by the computer system or it may be received from an external source. The external source may, e.g., be a server, like a cloud server, providing the three-dimensional digital dentition model via a network. The external source may, e.g., be a removable storage device providing the three-dimensional digital dentition model via a direct communication connection, e.g., wireless or via a wire.

In block 306, one or more holes of the three-dimensional digital preparation model to be closed within the bottom section are detected. These holes may, e.g., result from incomplete and/or erroneous scan data of the prepared tooth.

In block 308, a location for defining a margin line for the dental restoration element on the bottom section of the three-dimensional digital preparation model is selected. One or more holes of the detected one or more holes to be closed may extend across the selected location for the margin line requiring a closing of the respective holes, in order to be able to define a continuous margin line on the three-dimensional digital preparation model.

In block 310, a preparation angle used for preparing the bottom section is determined. The preparation angle is descriptive of an inclination of the bottom section relative to a reference direction.

In block 314, the detected one or more holes are closed. The closing comprises an extrapolation of the bottom section into the holes using the determined preparation angle.

In block 316, the margin line defining a lower limit for the dental restoration element is defined at the selected location for the margin line on the bottom section of the three-dimensional digital preparation model across the one or more closed holes.

Figure 15:
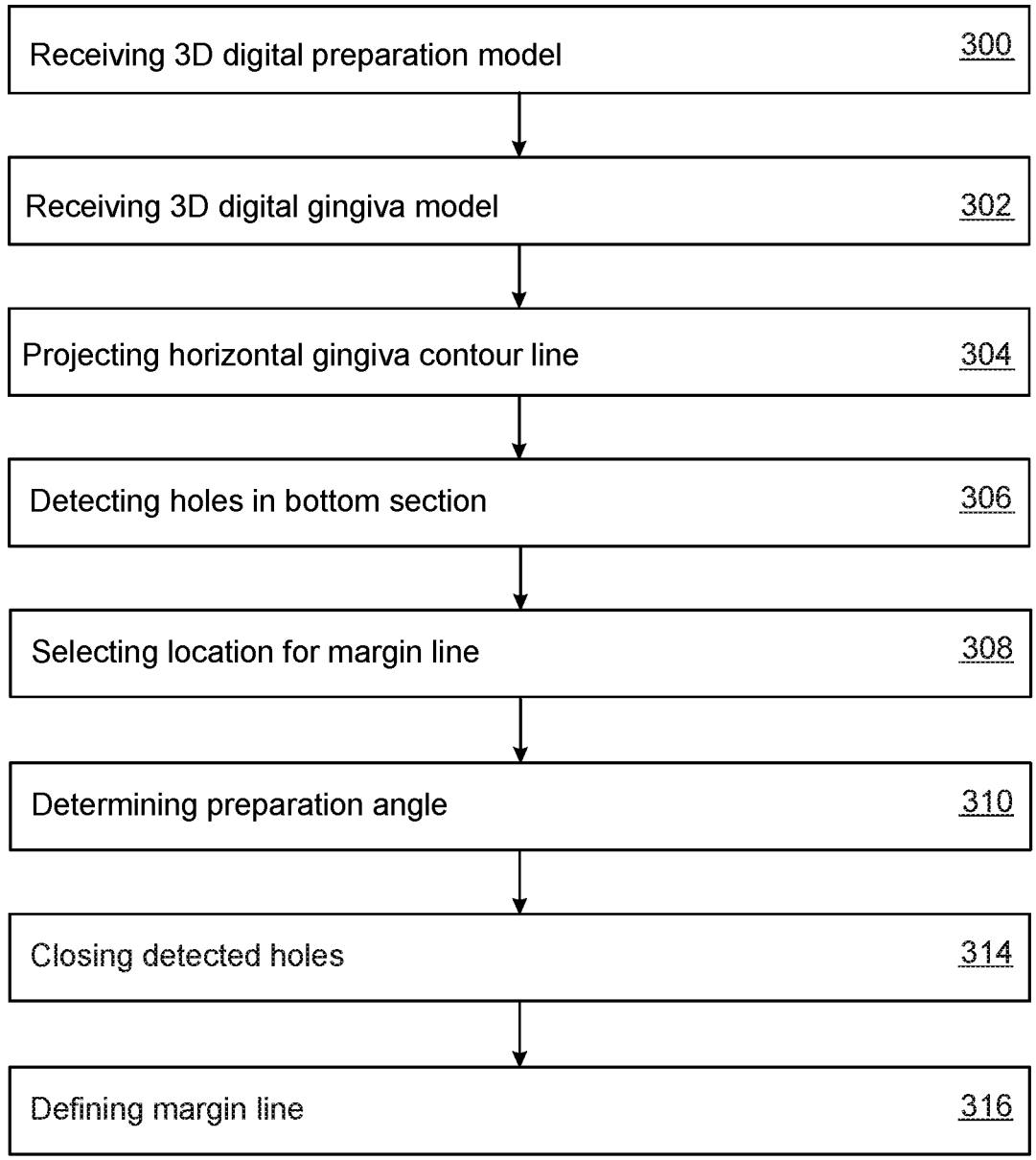
FIG. 15 shows a flowchart illustrating an exemplary method for defining a margin line using a projected gingiva contour line.

FIG. 15 shows an exemplary method for closing one or more holes in a bottom section of a three-dimensional digital preparation model of a preparation of a tooth. The three-dimensional digital preparation model with closed holes is used for providing a margin line on the bottom section, which is defines a lower limit of a dental restoration element to be arranged on the prepared tooth, in order to restore the same. The tooth is prepared for receiving a dental restoration element with a lower limit of the bottom section of the preparation being prepared in form of a stepless edge. For example, the stepless edge may be stepless feather edge or a stepless knife edge.

In block 300, the three-dimensional digital preparation model of the prepared tooth is received.

The three-dimensional digital preparation model of the prepared tooth is descriptive of a form, i.e., a current state, of the prepared tooth. The three-dimensional digital preparation model may be provided using scan data of the respective prepared tooth of the patient acquired using a scanner, e.g., an optical scanner. The scan may be a direct scan of the prepared tooth, e.g., an intraoral scan. Alternatively or additionally, an indirect scan of the prepared tooth may be used to acquire the scan data. For example, a dental impression of the prepared tooth or a dental model of the prepared, like a plaster model or a silicone model, may be scanned.

For example, the scan data of the prepared tooth may be comprised by scan data of a patient's dentition comprising the prepared tooth. The scan data of the dentition may be acquired using a scanner, e.g., an optical scanner. The scan may be a direct scan of the patient's dentition, e.g., an intraoral scan. Alternatively or additionally, an indirect scan of the patient's dentition may be used to acquire the scan data. For example, a dental impression of the patient's dentition or a dental model of the dentition, like a plaster model or a silicone model, may be scanned.

The three-dimensional digital preparation model may, e.g., be provided as part of a three-dimensional digital dentition model of the dentition of the patient. The three-dimensional digital dentition model of the dentition of the patient may be provided using scan data of the patient's dentition. The three-dimensional digital preparation model may be identified within the three-dimensional digital dentition model of the dentition of the patient using segmentation.

The three-dimensional digital preparation model may be a three-dimensional digital model of a current state of the prepared tooth. This three-dimensional digital preparation model as a current state model of the prepared tooth may resemble an actual state of the prepared tooth, i.e., it may be a digital replica of the prepared physical tooth. The three-dimensional digital preparation model may, in particular, resemble the geometric form of the prepared tooth. The three-dimensional digital preparation model may, e.g., be generated by the computer system executing the method using scan data of the prepared tooth or it may be received from an external source. The external source may, e.g., be a server, like a cloud server, providing the three-dimensional digital preparation model via a network. The external source may, e.g., be a removable storage device providing the three-dimensional digital preparation model via a direct communication connection, e.g., wireless or via a wire.

The three-dimensional digital preparation model may be provided as part of a three-dimensional digital dentition model of the dentition of the patient. The three-dimensional digital dentition model may be a three-dimensional digital model of a current state the dentition. This three-dimensional digital dentition model may be generated using the scan data of a direct and/or indirect scan of the dentition. The three-dimensional digital dentition model as a current state model of the respective dentition may resemble an actual state of the patient's dentition, i.e., it may be a digital replica of the physical dentition. The three-dimensional digital dentition model of the respective tooth may, in particular, resemble the geometric form of the physical dentition as well as the relative positions of the teeth comprised by the dentition. The three-dimensional digital dentition model may be generated by the computer system or it may be received from an external source. The external source may, e.g., be a server, like a cloud server, providing the three-dimensional digital dentition model via a network. The external source may, e.g., be a removable storage device providing the three-dimensional digital dentition model via a direct communication connection, e.g., wireless or via a wire.

In block 302 a three-dimensional digital gingiva model of a gingiva surrounding the prepared tooth described by the three-dimensional digital preparation model is received.

The three-dimensional digital gingiva model of gingiva surrounding the prepared tooth is descriptive of a form, i.e., a current state, of the of gingiva surrounding the prepared tooth. The three-dimensional digital gingiva model may be provided using scan data of the gingiva of the patient acquired using a scanner, e.g., an optical scanner. The scan may be a direct scan of the gingiva, e.g., an intraoral scan. Alternatively or additionally, an indirect scan of the gingiva may be used to acquire the scan data. For example, a dental impression of the gingiva or a dental model of the prepared, like a plaster model or a silicone model, may be scanned.

For example, the scan data of the gingiva may be comprised by scan data of a patient's dentition comprising the gingiva surrounding the prepared tooth. The scan data of the dentition may be acquired using a scanner, e.g., an optical scanner. The scan may be a direct scan of the patient's dentition, e.g., an intraoral scan. Alternatively or additionally, an indirect scan of the patient's dentition may be used to acquire the scan data. For example, a dental impression of the patient's dentition or a dental model of the dentition, like a plaster model or a silicone model, may be scanned.

The three-dimensional digital gingiva model may, e.g., be provided as part of a three-dimensional digital dentition model of the dentition of the patient. The three-dimensional digital dentition model of the dentition of the patient may be provided using scan data of the patient's dentition. The three-dimensional digital gingiva model may be identified within the three-dimensional digital dentition model of the dentition of the patient using segmentation.

The three-dimensional digital gingiva model may be a three-dimensional digital model of a current state of the gingiva. This three-dimensional digital gingiva model as a current state model of the gingiva may resemble an actual state of the gingiva, i.e., it may be a digital replica of the prepared physical tooth. The three-dimensional digital gingiva model may, in particular, resemble the geometric form of the gingiva. The three-dimensional digital gingiva model may, e.g., be generated by the computer system executing the method using scan data of the gingiva or it may be received from an external source. The external source may, e.g., be a server, like a cloud server, providing the three-dimensional digital gingiva model via a network. The external source may, e.g., be a removable storage device providing the three-dimensional digital gingiva model via a direct communication connection, e.g., wireless or via a wire.

In block 304, a horizontal gingiva contour line of a top edge of the three-dimensional digital gingiva model is projected onto the bottom section of the three-dimensional digital preparation model. The projected gingiva contour line extends circumferentially around the bottom section of the three-dimensional digital preparation model.

In block 306, one or more holes of the three-dimensional digital preparation model to be closed within the bottom section are detected. These holes may, e.g., result from incomplete and/or erroneous scan data of the prepared tooth.

In block 308, a location for defining a margin line for the dental restoration element on the bottom section of the three-dimensional digital preparation model is selected. One or more holes of the detected one or more holes to be closed may extend across the selected location for the margin line requiring a closing of the respective holes, in order to be able to define a continuous margin line on the three-dimensional digital preparation model. The location for the margin line on the bottom section may, e.g., be selected in a first predefined distance below the projected gingiva contour line.

In block 310, a preparation angle used for preparing the bottom section is determined. The preparation angle is descriptive of an inclination of the bottom section relative to a reference direction.

In block 314, the detected one or more holes are closed. The closing comprises an extrapolation of the bottom section into the holes using the determined preparation angle.

In block 316, the margin line defining a lower limit for the dental restoration element is defined at the selected location for the margin line on the bottom section of the three-dimensional digital preparation model across the one or more closed holes.

Figure 16:
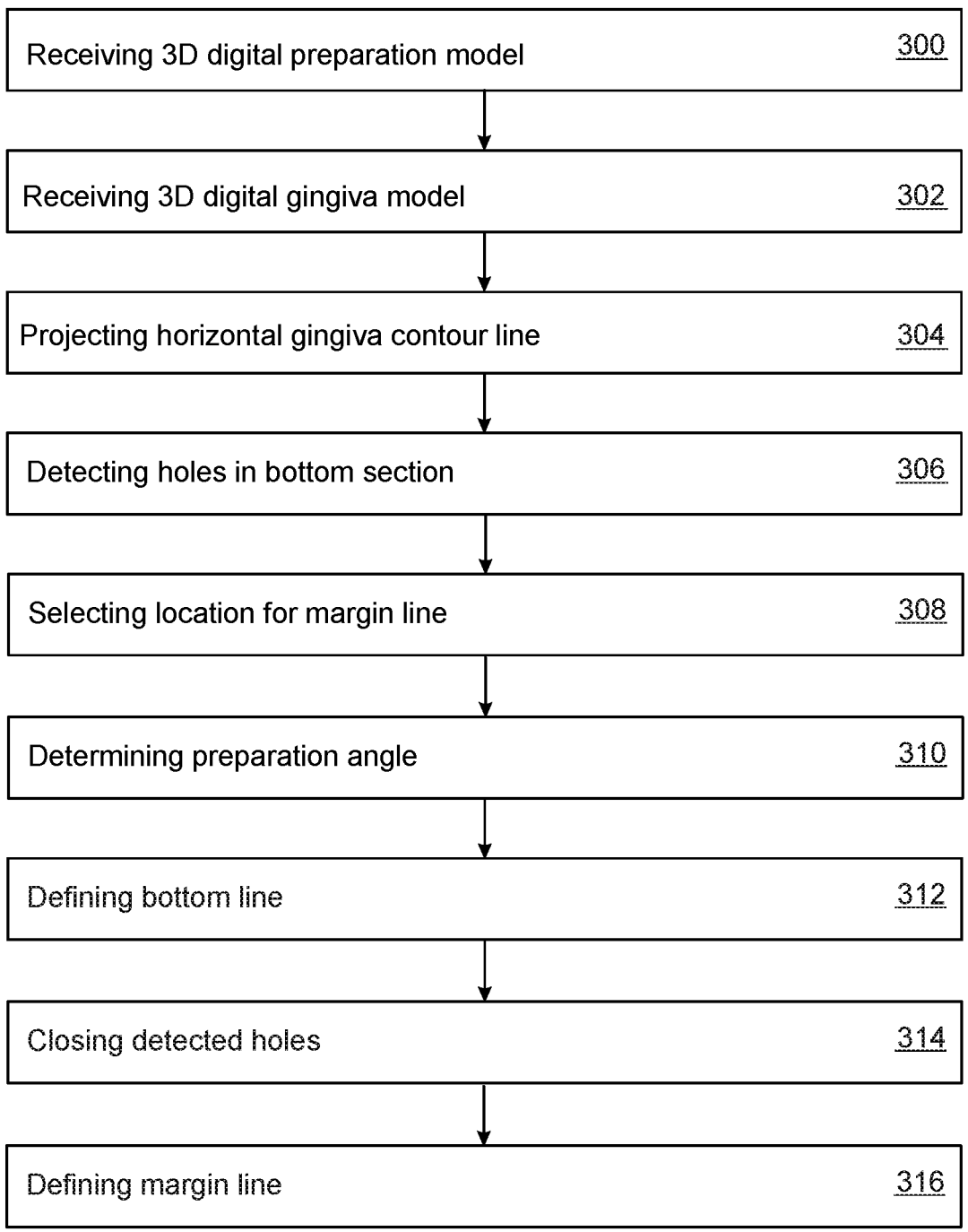
FIG. 16 shows a flowchart illustrating an exemplary method for extending a three-dimensional digital preparation model in an apical direction.

FIG. 16 shows an exemplary method for closing one or more holes in a bottom section of a three-dimensional digital preparation model of a preparation of a tooth. Closing the holes comprises extending the three-dimensional digital preparation model in apical direction. The three-dimensional digital preparation model with closed holes is used for providing a margin line on the bottom section, which defines a lower limit of a dental restoration element to be arranged on the prepared tooth, in order to restore the same. The tooth is prepared for receiving a dental restoration element with a lower limit of the bottom section of the preparation being prepared in form of a stepless edge. For example, the stepless edge may be stepless feather edge or a stepless knife edge.

In block 300, the three-dimensional digital preparation model of the prepared tooth is received.

The three-dimensional digital preparation model of the prepared tooth is descriptive of a form, i.e., a current state, of the prepared tooth. The three-dimensional digital preparation model may be provided using scan data of the respective prepared tooth of the patient acquired using a scanner, e.g., an optical scanner. The scan may be a direct scan of the prepared tooth, e.g., an intraoral scan. Alternatively or additionally, an indirect scan of the prepared tooth may be used to acquire the scan data. For example, a dental impression of the prepared tooth or a dental model of the prepared, like a plaster model or a silicone model, may be scanned.

For example, the scan data of the prepared tooth may be comprised by scan data of a patient's dentition comprising the prepared tooth. The scan data of the dentition may be acquired using a scanner, e.g., an optical scanner. The scan may be a direct scan of the patient's dentition, e.g., an intraoral scan. Alternatively or additionally, an indirect scan of the patient's dentition may be used to acquire the scan data. For example, a dental impression of the patient's dentition or a dental model of the dentition, like a plaster model or a silicone model, may be scanned.

The three-dimensional digital preparation model may, e.g., be provided as part of a three-dimensional digital dentition model of the dentition of the patient. The three-dimensional digital dentition model of the dentition of the patient may be provided using scan data of the patient's dentition. The three-dimensional digital preparation model may be identified within the three-dimensional digital dentition model of the dentition of the patient using segmentation.

The three-dimensional digital preparation model may be a three-dimensional digital model of a current state of the prepared tooth. This three-dimensional digital preparation model as a current state model of the prepared tooth may resemble an actual state of the prepared tooth, i.e., it may be a digital replica of the prepared physical tooth. The three-dimensional digital preparation model may, in particular, resemble the geometric form of the prepared tooth. The three-dimensional digital preparation model may, e.g., be generated by the computer system executing the method using scan data of the prepared tooth or it may be received from an external source. The external source may, e.g., be a server, like a cloud server, providing the three-dimensional digital preparation model via a network. The external source may, e.g., be a removable storage device providing the three-dimensional digital preparation model via a direct communication connection, e.g., wireless or via a wire.

The three-dimensional digital preparation model may be provided as part of a three-dimensional digital dentition model of the dentition of the patient. The three-dimensional digital dentition model may be a three-dimensional digital model of a current state the dentition. This three-dimensional digital dentition model may be generated using the scan data of a direct and/or indirect scan of the dentition. The three-dimensional digital dentition model as a current state model of the respective dentition may resemble an actual state of the patient's dentition, i.e., it may be a digital replica of the physical dentition. The three-dimensional digital dentition model of the respective tooth may, in particular, resemble the geometric form of the physical dentition as well as the relative positions of the teeth comprised by the dentition. The three-dimensional digital dentition model may be generated by the computer system or it may be received from an external source. The external source may, e.g., be a server, like a cloud server, providing the three-dimensional digital dentition model via a network. The external source may, e.g., be a removable storage device providing the three-dimensional digital dentition model via a direct communication connection, e.g., wireless or via a wire.

In block 302 a three-dimensional digital gingiva model of a gingiva surrounding the prepared tooth described by the three-dimensional digital preparation model is received.

The three-dimensional digital gingiva model of gingiva surrounding the prepared tooth is descriptive of a form, i.e., a current state, of the of gingiva surrounding the prepared tooth. The three-dimensional digital gingiva model may be provided using scan data of the gingiva of the patient acquired using a scanner, e.g., an optical scanner. The scan may be a direct scan of the gingiva, e.g., an intraoral scan. Alternatively or additionally, an indirect scan of the gingiva may be used to acquire the scan data. For example, a dental impression of the gingiva or a dental model of the prepared, like a plaster model or a silicone model, may be scanned.

For example, the scan data of the gingiva may be comprised by scan data of a patient's dentition comprising the gingiva surrounding the prepared tooth. The scan data of the dentition may be acquired using a scanner, e.g., an optical scanner. The scan may be a direct scan of the patient's dentition, e.g., an intraoral scan. Alternatively or additionally, an indirect scan of the patient's dentition may be used to acquire the scan data. For example, a dental impression of the patient's dentition or a dental model of the dentition, like a plaster model or a silicone model, may be scanned.

The three-dimensional digital gingiva model may, e.g., be provided as part of a three-dimensional digital dentition model of the dentition of the patient. The three-dimensional digital dentition model of the dentition of the patient may be provided using scan data of the patient's dentition. The three-dimensional digital gingiva model may be identified within the three-dimensional digital dentition model of the dentition of the patient using segmentation.

The three-dimensional digital gingiva model may be a three-dimensional digital model of a current state of the gingiva. This three-dimensional digital gingiva model as a current state model of the gingiva may resemble an actual state of the gingiva, i.e., it may be a digital replica of the prepared physical tooth. The three-dimensional digital gingiva model may, in particular, resemble the geometric form of the gingiva. The three-dimensional digital gingiva model may, e.g., be generated by the computer system executing the method using scan data of the gingiva or it may be received from an external source. The external source may, e.g., be a server, like a cloud server, providing the three-dimensional digital gingiva model via a network. The external source may, e.g., be a removable storage device providing the three-dimensional digital gingiva model via a direct communication connection, e.g., wireless or via a wire.

In block 304, a horizontal gingiva contour line of a top edge of the three-dimensional digital gingiva model is projected onto the bottom section of the three-dimensional digital preparation model. The projected gingiva contour line extends circumferentially around the bottom section of the three-dimensional digital preparation model.

In block 306, one or more holes of the three-dimensional digital preparation model to be closed within the bottom section are detected. These holes may, e.g., result from incomplete and/or erroneous scan data of the prepared tooth.

In block 308, a location for defining a margin line for the dental restoration element on the bottom section of the three-dimensional digital preparation model is selected. One or more holes of the detected one or more holes to be closed may extend across the selected location for the margin line requiring a closing of the respective holes, in order to be able to define a continuous margin line on the three-dimensional digital preparation model. The location for the margin line on the bottom section may, e.g., be selected in a first predefined distance below the projected gingiva contour line.

In block 310, a preparation angle used for preparing the bottom section is determined. The preparation angle is descriptive of an inclination of the bottom section relative to a reference direction.

In block 312 a bottom line is defined below the projected gingiva contour line. The bottom line extends circumferentially around the bottom section.

In block 314, the detected one or more holes are closed. The closing comprises an extrapolation of the bottom section into the holes using the determined preparation angle. The closing of the holes may comprise extending the bottom section in an apical direction of the prepared tooth down to the bottom line.

In block 316, the margin line defining a lower limit for the dental restoration element is defined at the selected location for the margin line on the bottom section of the three-dimensional digital preparation model across the one or more closed holes.

Figure 17:
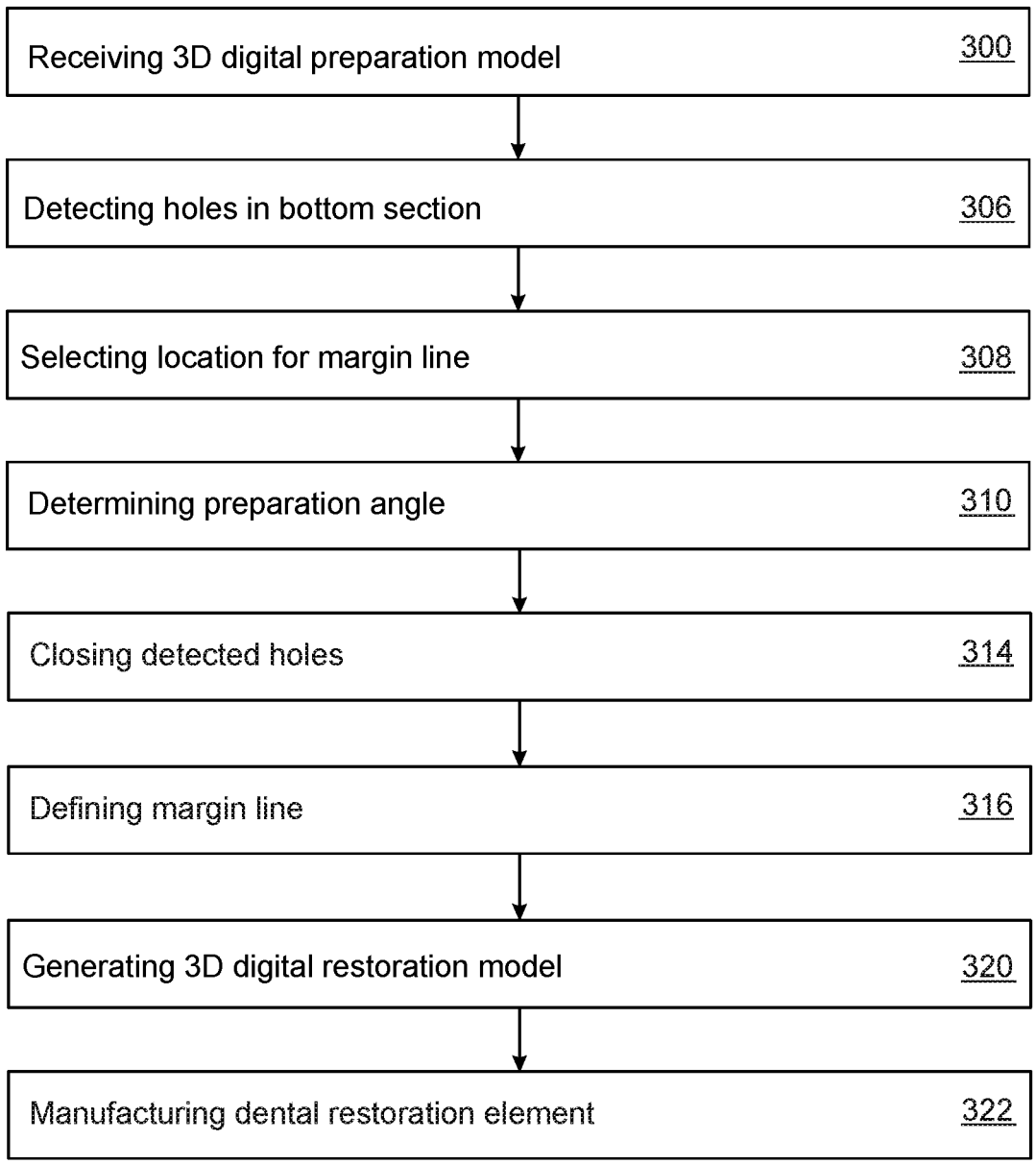
FIG. 17 shows a flowchart illustrating an exemplary method for manufacturing a dental restoration element using a margin line.

FIG. 17 shows an exemplary method for manufacturing a dental restoration element using a three-dimensional digital preparation model of a preparation of a tooth with closed holes and a margin line defined thereon. The margin line defines a lower limit of the dental restoration element to be manufactured. The dental restoration element is configured to be arranged on the prepared tooth, in order to restore the same. The tooth is prepared for receiving the dental restoration element with a lower limit of a bottom section of the preparation being prepared in form of a stepless edge. For example, the stepless edge may be stepless feather edge or a stepless knife edge.

Blocks 300, 306, 308, 310, 314, and 316 of FIG. 17 may be identical to blocks 300, 306, 308, 310, 314, and 316 of FIG. 14

In block 320, a three-dimensional digital restoration model of the dental restoration element to be arranged on the prepared tooth is generated using the three-dimensional digital preparation model and the margin line defined for the dental restoration element. For generating of the three-dimensional digital restoration, a three-dimensional digital artificial tooth model, e.g., a three-dimensional digital library tooth model from a digital tooth library may be used. For example, the three-dimensional digital library tooth model may in addition be adjusted to the dentition of the patient. The three-dimensional digital artificial tooth model defines a form of the prepared tooth to be restored using the dental restoration element and is subtracted from the three-dimensional digital artificial tooth model.

Furthermore, block 320 may comprise adjusting a tapering of the bottom section before the subtracting of the three-dimensional digital preparation model such that the adjusted bottom section comprises an adjusted constant preparation angle. The adjusted constant preparation angle is equal to a largest preparation angle of the bottom section before the adjusting.

Alternatively, block 320 may comprises adjusting the tapering of the tapered bottom section before subtracting the three-dimensional digital preparation model such that the adjusted bottom section comprises an adjusted constant preparation angle. The adjusted constant preparation angle is equal to a largest preparation angle of the bottom section before the adjusting increased by a second predefined amount.

For generating the three-dimensional digital restoration model of the dental restoration element to be arranged on the prepared tooth, e.g., a three-dimensional digital library tooth model from a digital tooth library may be used. For example, the three-dimensional digital library tooth model may in addition be adjusted to the dentition of the patient. For example, a three-dimensional digital model of another tooth of the patient's dentition, e.g., an opposite tooth of the prepared tooth within the same dental arch or an antagonist, may be used for generating the three-dimensional digital restoration model. The three-dimensional digital model of the other tooth may be generated using scan data of the respective other tooth. For example, the three-dimensional digital model of the other tooth may in addition be adjusted to the dentition of the patient. For example, a three-dimensional digital tooth model descriptive of the form of the prepared tooth before the preparation may be used for generating the generating the three-dimensional digital restoration model. For example, the three-dimensional digital tooth model may be adjusted. For example, the three-dimensional digital restoration model may be generated from scratch.

For example, a trained machine learning module may be used for generating the three-dimensional digital artificial tooth model. For generating the three-dimensional digital artificial tooth model, the trained machine learning module may, e.g., use the three-dimensional digital preparation model. The three-dimensional digital artificial tooth model may be received as output from the trained machine learning module in response to providing the three-dimensional digital preparation model with closed holes as input. For example, the three-dimensional digital preparation model may be provided as part of a three-dimensional digital dentition model as input to the trained machine learning module.

The trained machine learning module may be trained to provide the three-dimensional digital artificial tooth model as output in response to receiving the three-dimensional digital preparation model with closed holes as input. The trained machine learning module may be trained to provide the three-dimensional digital artificial tooth model as output in response to receiving a three-dimensional digital dentition model comprising the three-dimensional digital preparation model as input.

For example, a providing of the trained machine learning module may comprise providing a machine learning module to be trained. A set of training datasets may be provided for training the machine learning module to be trained. For example, each training dataset may comprise a three-dimensional digital training preparation model as well as a three-dimensional digital training artificial tooth model. The machine learning module to be trained may be trained to provide the three-dimensional digital training artificial tooth models of the training datasets as an output in response to receiving the three-dimensional digital training preparation models of the respective training datasets as input.

For example, each training dataset may comprise a three-dimensional digital training dentition model as well as a three-dimensional digital training artificial tooth model. The three-dimensional digital training dentition models may comprise three-dimensional digital training preparation models, for which the three-dimensional digital training artificial tooth model are to be provided. The machine learning module to be trained may be trained to provide the three-dimensional digital training artificial tooth models of the training datasets as an output in response to receiving the three-dimensional digital training dentition models of the respective training datasets as input.

For example, each training dataset may comprise a three-dimensional digital training dentition model as well as a three-dimensional digital training artificial tooth model. The three-dimensional digital training dentition models may comprise one or more three-dimensional digital training preparation models, for which the three-dimensional digital training artificial tooth model are to be provided. The machine learning module to be trained may be trained to provide the three-dimensional digital training artificial tooth models of the training datasets as an output in response to receiving the three-dimensional digital training dentition models of the respective training datasets as input. The three-dimensional digital training artificial tooth models may, e.g., be provided in form of modified three-dimensional digital training dentition models comprising the three-dimensional digital training preparation models. The modified three-dimensional digital training dentition models may correspond to the three-dimensional digital training dentition models used as input with the three-dimensional digital training preparation models replaced by the three-dimensional digital training artificial tooth models.

The machine learning module to be trained may, e.g., be an untrained machine learning module, a pre-trained machine learning module or a partially trained machine learning module. The machine learning module being trained may be an untrained machine learning module, which is trained from scratch. Alternatively, the machine learning module being trained may be a pre-trained or partially trained machine learning module. In general, it may not be necessary to start with an untrained machine learning module, e.g., in deep learning. For example, one may start with a pre-trained or partially trained machine learning module. The pre-trained or partially trained machine learning module may have been pre-trained or partially trained for the same or a similar task. Using a pre-trained or partially trained machine learning may, e.g., enable a faster training of the trained machine learning module to be trained, i.e., the training may converge faster. For example, transfer learning may be used for training a pre-trained or partially trained machine learning module. Transfer learning refers to a machine learning process, which rather than starting the learning process from scratch starts from patterns that have been previously learned, when solving a different problem. This way previous learnings may, e.g., be leveraged, avoiding to start from scratch. A pre-trained machine learning module is a machine learning module that was trained previously, e.g., on a large benchmark dataset to solve a problem similar to the one to be solved by the additional learning. In case of a pre-trained machine learning module a previous learning process has been completed successfully. A partially trained machine learning module is a machine learning module, which has been partially trained, i.e., the training process may not have been completed yet. A pre-trained or partially machine learning module may, e.g., be import and trained to be used for the purposes disclosed herein.

In block 322, the dental restoration element is manufactured using the three-dimensional digital restoration model as a template. The manufactured dental restoration element is a physical copy of the respective template. For manufacturing the dental restoration element, e.g., additive methods, like 3D printing and/or casting, may be used. Alternatively or additionally, subtractive methods, e.g., comprises machining, may be used.

For example, the dental restoration element may be manufactured using a machining device configured to manufacture the dental restoration element by processing a blank of restoration material. The resulting dental restoration element may be configured to be arranged on the prepared tooth resulting in a restored tooth with the target form as defined by three-dimensional digital artificial tooth model.

For example, the dental restoration element may be manufactured using a 3D printing device, i.e., a printer, configured to print the dental restoration element. The resulting dental restoration element may be configured to be arranged on the prepared tooth resulting in a restored tooth with the target form as defined by three-dimensional digital artificial tooth model.

For example, the three-dimensional digital restoration model may be used as a positive to define a negative of the physical dental restoration element in form of a negative three-dimensional digital restoration model. The negative three-dimensional digital restoration model may be used to manufacture, e.g., using machining or 3D printing, a casting matrix. The casting matrix may be configured for casting the physical dental restoration element by inserting restoration material into the casting matrix and curing the inserted restoration material. The resulting dental restoration element may be configured to be arranged on the prepared tooth resulting in a restored tooth with the target form as defined by three-dimensional digital artificial tooth model.

Figure 18:
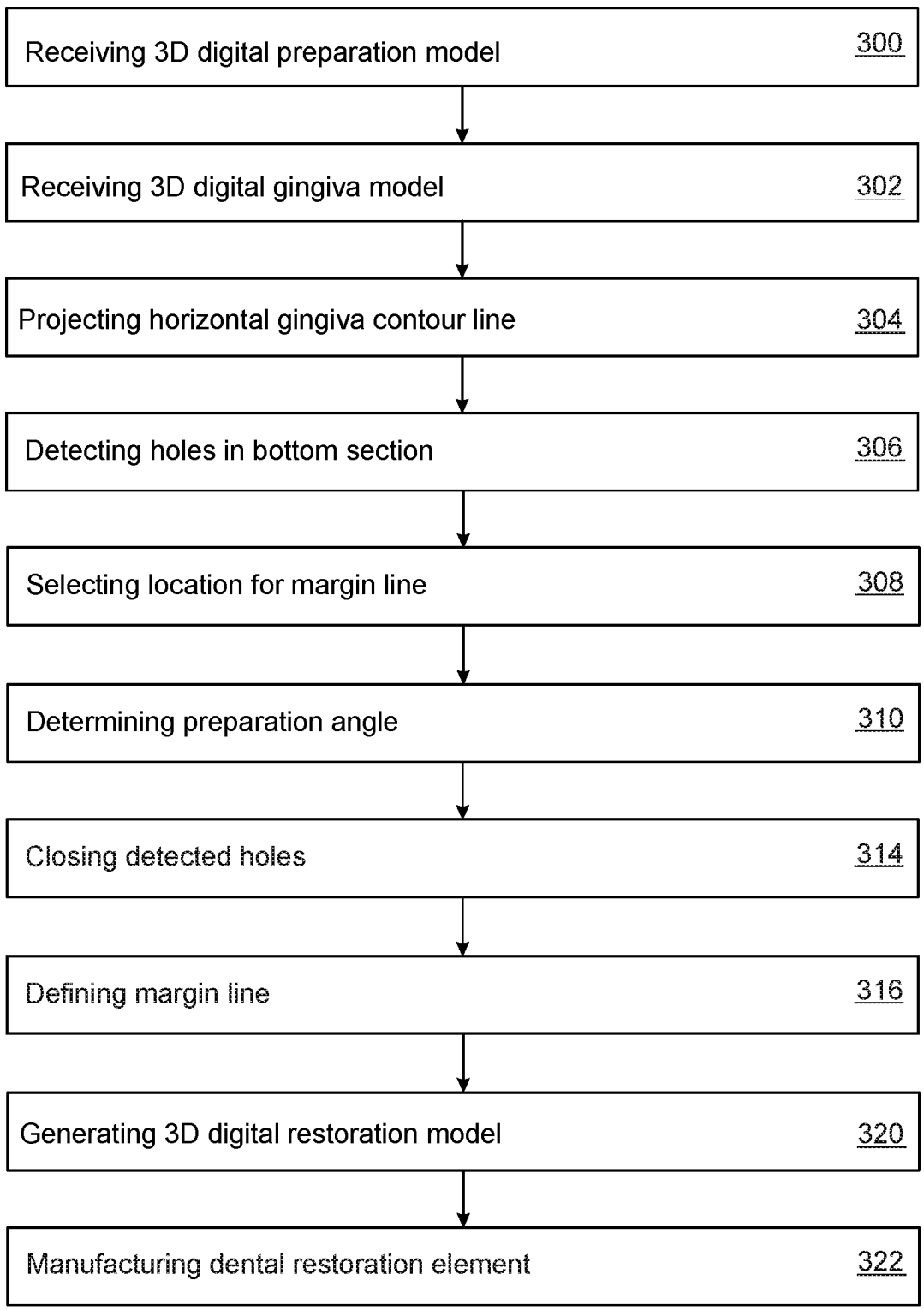
FIG. 18 shows a flowchart illustrating an exemplary method for manufacturing a dental restoration element using a margin line.

FIG. 18 shows an exemplary method for manufacturing a dental restoration element using a three-dimensional digital preparation model of a preparation of a tooth with closed holes and a margin line defined thereon. The margin line defines a lower limit of the dental restoration element to be manufactured. The dental restoration element is configured to be arranged on the prepared tooth, in order to restore the same. The tooth is prepared for receiving the dental restoration element with a lower limit of a bottom section of the preparation being prepared in form of a stepless edge. For example, the stepless edge may be stepless feather edge or a stepless knife edge.

Blocks 300, 302, 304, 306, 308, 310, 314, and 316 of FIG. 18 may be identical to blocks 300, 302, 304, 306, 308, 310, 314, and 316 of FIG. 15.

In block 320, a three-dimensional digital restoration model of the dental restoration element to be arranged on the prepared tooth is generated using the three-dimensional digital preparation model and the margin line defined for the dental restoration element. For generating of the three-dimensional digital restoration, a three-dimensional digital artificial tooth model, e.g., a three-dimensional digital library tooth model from a digital tooth library may be used. For example, the three-dimensional digital library tooth model may in addition be adjusted to the dentition of the patient. The three-dimensional digital artificial tooth model defines a form of the prepared tooth to be restored using the dental restoration element and is subtracted from the three-dimensional digital artificial tooth model.

Furthermore, block 320 may comprise adjusting a tapering of the bottom section before the subtracting of the three-dimensional digital preparation model such that the adjusted bottom section comprises an adjusted constant preparation angle. The adjusted constant preparation angle is equal to a largest preparation angle of the bottom section before the adjusting.

Alternatively, block 320 may comprises adjusting the tapering of the tapered bottom section before subtracting the three-dimensional digital preparation model such that the adjusted bottom section comprises an adjusted constant preparation angle. The adjusted constant preparation angle is equal to a largest preparation angle of the bottom section before the adjusting increased by a second predefined amount.

For generating the three-dimensional digital restoration model of the dental restoration element to be arranged on the prepared tooth, e.g., a three-dimensional digital library tooth model from a digital tooth library may be used. For example, the three-dimensional digital library tooth model may in addition be adjusted to the dentition of the patient. For example, a three-dimensional digital model of another tooth of the patient's dentition, e.g., an opposite tooth of the prepared tooth within the same dental arch or an antagonist, may be used for generating the three-dimensional digital restoration model. The three-dimensional digital model of the other tooth may be generated using scan data of the respective other tooth. For example, the three-dimensional digital model of the other tooth may in addition be adjusted to the dentition of the patient. For example, a three-dimensional digital tooth model descriptive of the form of the from scratch.

For example, a trained machine learning module may be used for generating the three-dimensional digital artificial tooth model. For generating the three-dimensional digital artificial tooth model, the trained machine learning module may, e.g., use the three-dimensional digital preparation model. The three-dimensional digital artificial tooth model may be received as output from the trained machine learning module in response to providing the three-dimensional digital preparation model with closed holes as input. For example, the three-dimensional digital preparation model may be provided as part of a three-dimensional digital dentition model as input to the trained machine learning module.

The trained machine learning module may be trained to provide the three-dimensional digital artificial tooth model as output in response to receiving the three-dimensional digital preparation model with closed holes as input. The trained machine learning module may be trained to provide the three-dimensional digital artificial tooth model as output in response to receiving a three-dimensional digital dentition model comprising the three-dimensional digital preparation model as input.

For example, a providing of the trained machine learning module may comprise providing a machine learning module to be trained. A set of training datasets may be provided for training the machine learning module to be trained. For example, each training dataset may comprise a three-dimensional digital training preparation model as well as a three-dimensional digital training artificial tooth model. The machine learning module to be trained may be trained to provide the three-dimensional digital training artificial tooth models of the training datasets as an output in response to receiving the three-dimensional digital training preparation models of the respective training datasets as input.

For example, each training dataset may comprise a three-dimensional digital training dentition model as well as a three-dimensional digital training artificial tooth model. The three-dimensional digital training dentition models may comprise three-dimensional digital training preparation models, for which the three-dimensional digital training artificial tooth model are to be provided. The machine learning module to be trained may be trained to provide the three-dimensional digital training artificial tooth models of the training datasets as an output in response to receiving the three-dimensional digital training dentition models of the respective training datasets as input.

For example, each training dataset may comprise a three-dimensional digital training dentition model as well as a three-dimensional digital training artificial tooth model. The three-dimensional digital training dentition models may comprise one or more three-dimensional digital training preparation models, for which the three-dimensional digital training artificial tooth model are to be provided. The machine learning module to be trained may be trained to provide the three-dimensional digital training artificial tooth models of the training datasets as an output in response to receiving the three-dimensional digital training dentition models of the respective training datasets as input. The three-dimensional digital training artificial tooth models may, e.g., be provided in form of modified three-dimensional digital training dentition models comprising the three-dimensional digital training preparation models. The modified three-dimensional digital training dentition models may correspond to the three-dimensional digital training dentition models used as input with the three-dimensional digital training preparation models replaced by the three-dimensional digital training artificial tooth models.

The machine learning module to be trained may, e.g., be an untrained machine learning module, a pre-trained machine learning module or a partially trained machine learning module. The machine learning module being trained may be an untrained machine learning module, which is trained from scratch. Alternatively, the machine learning module being trained may be a pre-trained or partially trained machine learning module. In general, it may not be necessary to start with an untrained machine learning module, e.g., in deep learning. For example, one may start with a pre-trained or partially trained machine learning module. The pre-trained or partially trained machine learning module may have been pre-trained or partially trained for the same or a similar task. Using a pre-trained or partially trained machine learning may, e.g., enable a faster training of the trained machine learning module to be trained, i.e., the training may converge faster. For example, transfer learning may be used for training a pre-trained or partially trained machine learning module. Transfer learning refers to a machine learning process, which rather than starting the learning process from scratch starts from patterns that have been previously learned, when solving a different problem. This way previous learnings may, e.g., be leveraged, avoiding to start from scratch. A pre-trained machine learning module is a machine learning module that was trained previously, e.g., on a large benchmark dataset to solve a problem similar to the one to be solved by the additional learning. In case of a pre-trained machine learning module a previous learning process has been completed successfully. A partially trained machine learning module is a machine learning module, which has been partially trained, i.e., the training process may not have been completed yet. A pre-trained or partially machine learning module may, e.g., be import and trained to be used for the purposes disclosed herein.

In block 322, the dental restoration element is manufactured using the three-dimensional digital restoration model as a template. The manufactured dental restoration element is a physical copy of the respective template. For manufacturing the dental restoration element, e.g., additive methods, like 3D printing and/or casting, may be used. Alternatively or additionally, subtractive methods, e.g., comprises machining, may be used.

For example, the dental restoration element may be manufactured using a machining device configured to manufacture the dental restoration element by processing a blank of restoration material. The resulting dental restoration element may be configured to be arranged on the prepared tooth resulting in a restored tooth with the target form as defined by three-dimensional digital artificial tooth model.

For example, the dental restoration element may be manufactured using a 3D printing device, i.e., a printer, configured to print the dental restoration element. The resulting dental restoration element may be configured to be arranged on the prepared tooth resulting in a restored tooth with the target form as defined by three-dimensional digital artificial tooth model.

For example, the three-dimensional digital restoration model may be used as a positive to define a negative of the physical dental restoration element in form of a negative three-dimensional digital restoration model. The negative three-dimensional digital restoration model may be used to manufacture, e.g., using machining or 3D printing, a casting matrix. The casting matrix may be configured for casting the physical dental restoration element by inserting restoration material into the casting matrix and curing the inserted restoration material. The resulting dental restoration element may be configured to be arranged on the prepared tooth resulting in a restored tooth with the target form as defined by three-dimensional digital artificial tooth model.

Figure 19A:
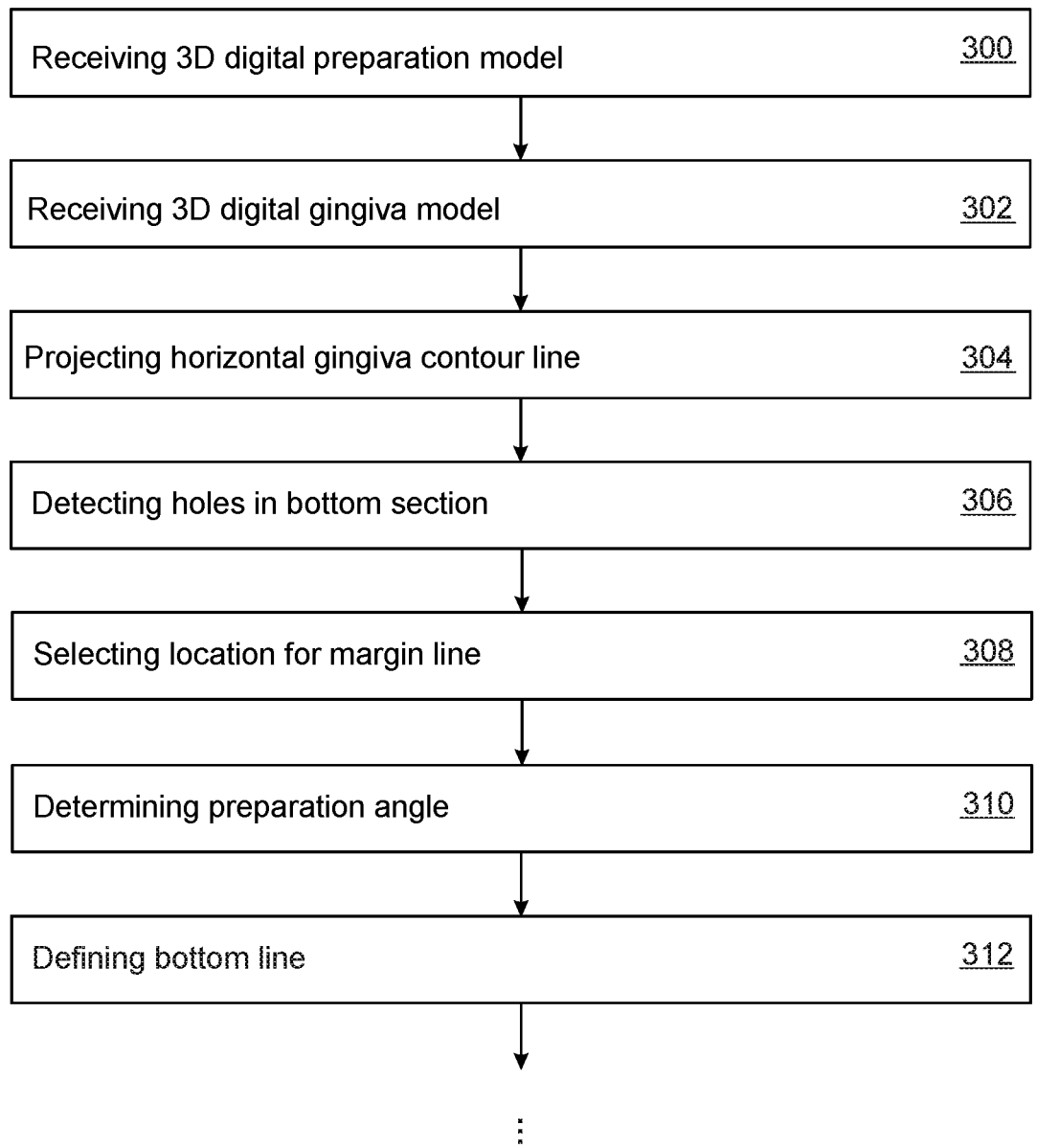
FIG. 19A and FIG. 19B show a flowchart illustrating an exemplary method for manufacturing a dental restoration element using a margin line.
Figure 19B:
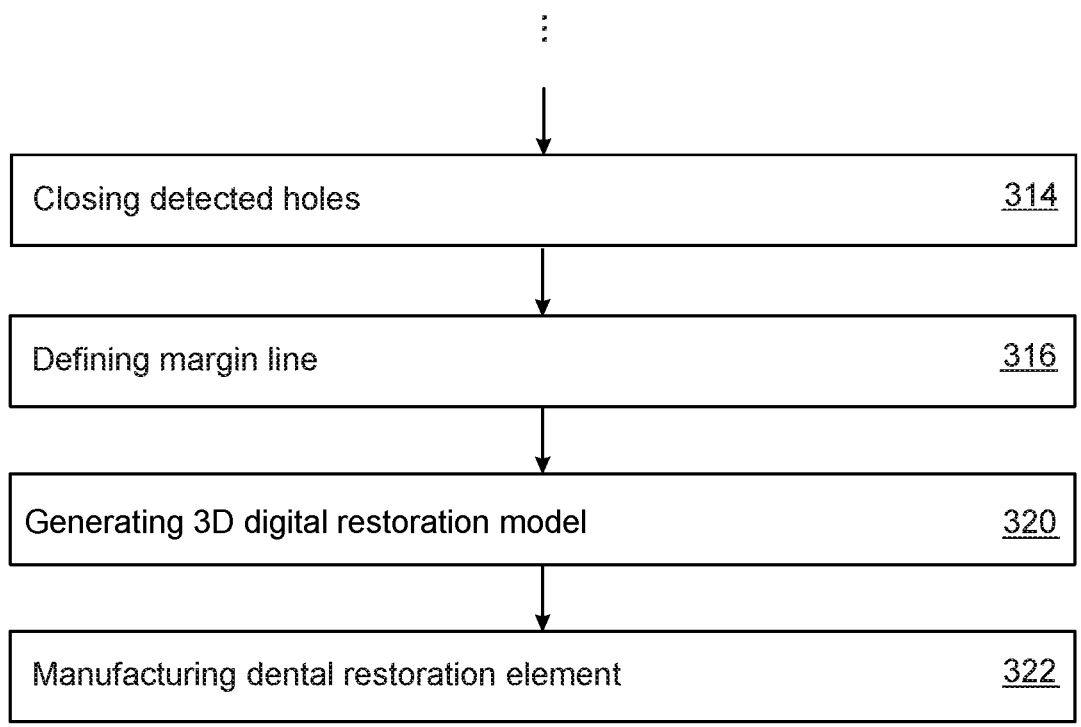

FIG. 19A and FIG. 19B show an exemplary method for manufacturing a dental restoration element using a three-dimensional digital preparation model of a preparation of a tooth with closed holes and a margin line defined thereon. Closing the holes comprises extending the three-dimensional digital preparation model in apical direction. The margin line defines a lower limit of the dental restoration element to be manufactured. The dental restoration element is configured to be arranged on the prepared tooth, in order to restore the same. The tooth is prepared for receiving the dental restoration element with a lower limit of a bottom section of the preparation being prepared in form of a stepless edge. For example, the stepless edge may be stepless feather edge or a stepless knife edge.

Blocks 300, 302, 304, 306, 308, 310, 312, 314, and 316 of FIG. 19A and FIG. 19B may be identical to blocks 300, 302, 304, 306, 308, 310, 312, 314, and 316 of FIG. 16.

In block 320, a three-dimensional digital restoration model of the dental restoration element to be arranged on the prepared tooth is generated using the three-dimensional digital preparation model and the margin line defined for the dental restoration element. For generating of the three-dimensional digital restoration, a three-dimensional digital artificial tooth model, e.g., a three-dimensional digital library tooth model from a digital tooth library may be used.

For example, the three-dimensional digital library tooth model may in addition be adjusted to the dentition of the patient. The three-dimensional digital artificial tooth model defines a form of the prepared tooth to be restored using the dental restoration element and is subtracted from the three-dimensional digital artificial tooth model.

Furthermore, block 320 may comprise adjusting a tapering of the bottom section before the subtracting of the three-dimensional digital preparation model such that the adjusted bottom section comprises an adjusted constant preparation angle. The adjusted constant preparation angle is equal to a largest preparation angle of the bottom section before the adjusting.

Alternatively, block 320 may comprises adjusting the tapering of the tapered bottom section before subtracting the three-dimensional digital preparation model such that the adjusted bottom section comprises an adjusted constant preparation angle. The adjusted constant preparation angle is equal to a largest preparation angle of the bottom section before the adjusting increased by a second predefined amount.

For generating the three-dimensional digital restoration model of the dental restoration element to be arranged on the prepared tooth, e.g., a three-dimensional digital library tooth model from a digital tooth library may be used. For example, the three-dimensional digital library tooth model may in addition be adjusted to the dentition of the patient. For example, a three-dimensional digital model of another tooth of the patient's dentition, e.g., an opposite tooth of the prepared tooth within the same dental arch or an antagonist, may be used for generating the three-dimensional digital restoration model. The three-dimensional digital model of the other tooth may be generated using scan data of the respective other tooth. For example, the three-dimensional digital model of the other tooth may in addition be adjusted to the dentition of the patient. For example, a three-dimensional digital tooth model descriptive of the form of the prepared tooth before the preparation may be used for generating the generating the three-dimensional digital restoration model. For example, the three-dimensional digital tooth model may be adjusted. For example, the three-dimensional digital restoration model may be generated from scratch.

For example, a trained machine learning module may be used for generating the three-dimensional digital artificial tooth model. For generating the three-dimensional digital artificial tooth model, the trained machine learning module may, e.g., use the three-dimensional digital preparation model. The three-dimensional digital artificial tooth model may be received as output from the trained machine learning module in response to providing the three-dimensional digital preparation model with closed holes as input. For example, the three-dimensional digital preparation model may be provided as part of a three-dimensional digital dentition model as input to the trained machine learning module.

The trained machine learning module may be trained to provide the three-dimensional digital artificial tooth model as output in response to receiving the three-dimensional digital preparation model with closed holes as input. The trained machine learning module may be trained to provide the three-dimensional digital artificial tooth model as output in response to receiving a three-dimensional digital dentition model comprising the three-dimensional digital preparation model as input.

For example, a providing of the trained machine learning module may comprise providing a machine learning module to be trained. A set of training datasets may be provided for training the machine learning module to be trained. For example, each training dataset may comprise a three-dimensional digital training preparation model as well as a three-dimensional digital training artificial tooth model. The machine learning module to be trained may be trained to provide the three-dimensional digital training artificial tooth models of the training datasets as an output in response to receiving the three-dimensional digital training preparation models of the respective training datasets as input.

For example, each training dataset may comprise a three-dimensional digital training dentition model as well as a three-dimensional digital training artificial tooth model. The three-dimensional digital training dentition models may comprise three-dimensional digital training preparation models, for which the three-dimensional digital training artificial tooth model are to be provided. The machine learning module to be trained may be trained to provide the three-dimensional digital training artificial tooth models of the training datasets as an output in response to receiving the three-dimensional digital training dentition models of the respective training datasets as input.

For example, each training dataset may comprise a three-dimensional digital training dentition model as well as a three-dimensional digital training artificial tooth model. The three-dimensional digital training dentition models may comprise one or more three-dimensional digital training preparation models, for which the three-dimensional digital training artificial tooth model are to be provided. The machine learning module to be trained may be trained to provide the three-dimensional digital training artificial tooth models of the training datasets as an output in response to receiving the three-dimensional digital training dentition models of the respective training datasets as input. The three-dimensional digital training artificial tooth models may, e.g., be provided in form of modified three-dimensional digital training dentition models comprising the three-dimensional digital training preparation models. The modified three-dimensional digital training dentition models may correspond to the three-dimensional digital training dentition models used as input with the three-dimensional digital training preparation models replaced by the three-dimensional digital training artificial tooth models.

The machine learning module to be trained may, e.g., be an untrained machine learning module, a pre-trained machine learning module or a partially trained machine learning module. The machine learning module being trained may be an untrained machine learning module, which is trained from scratch. Alternatively, the machine learning module being trained may be a pre-trained or partially trained machine learning module. In general, it may not be necessary to start with an untrained machine learning module, e.g., in deep learning. For example, one may start with a pre-trained or partially trained machine learning module. The pre-trained or partially trained machine learning module may have been pre-trained or partially trained for the same or a similar task. Using a pre-trained or partially trained machine learning may, e.g., enable a faster training of the trained machine learning module to be trained, i.e., the training may converge faster. For example, transfer learning may be used for training a pre-trained or partially trained machine learning module. Transfer learning refers to a machine learning process, which rather than starting the learning process from scratch starts from patterns that have been previously learned, when solving a different problem. This way previous learnings may, e.g., be leveraged, avoiding to start from scratch. A pre-trained machine learning module is a machine learning module that was trained previously, e.g., on a large benchmark dataset to solve a problem similar to the one to be solved by the additional learning. In case of a pre-trained machine learning module a previous learning process has been completed successfully. A partially trained machine learning module is a machine learning module, which has been partially trained, i.e., the training process may not have been completed yet. A pre-trained or partially machine learning module may, e.g., be import and trained to be used for the purposes disclosed herein.

In block 322, the dental restoration element is manufactured using the three-dimensional digital restoration model as a template. The manufactured dental restoration element is a physical copy of the respective template. For manufacturing the dental restoration element, e.g., additive methods, like 3D printing and/or casting, may be used. Alternatively or additionally, subtractive methods, e.g., comprises machining, may be used.

For example, the dental restoration element may be manufactured using a machining device configured to manufacture the dental restoration element by processing a blank of restoration material. The resulting dental restoration element may be configured to be arranged on the prepared tooth resulting in a restored tooth with the target form as defined by three-dimensional digital artificial tooth model.

For example, the dental restoration element may be manufactured using a 3D printing device, i.e., a printer, configured to print the dental restoration element. The resulting dental restoration element may be configured to be arranged on the prepared tooth resulting in a restored tooth with the target form as defined by three-dimensional digital artificial tooth model.

For example, the three-dimensional digital restoration model may be used as a positive to define a negative of the physical dental restoration element in form of a negative three-dimensional digital restoration model. The negative three-dimensional digital restoration model may be used to manufacture, e.g., using machining or 3D printing, a casting matrix. The casting matrix may be configured for casting the physical dental restoration element by inserting restoration material into the casting matrix and curing the inserted restoration material. The resulting dental restoration element may be configured to be arranged on the prepared tooth resulting in a restored tooth with the target form as defined by three-dimensional digital artificial tooth model.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable signal medium or a computer readable storage medium. A "computer-readable storage medium" as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. For example, a computer-readable storage medium may also be able to store data which is able to be accessed by the processor of the computing device. Examples of computer-readable storage media include, but are not limited to: a floppy disk, a magnetic hard disk drive, a solid-state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. A further example of an optical disk may be a Blu-ray disk. The term computer readable-storage medium also refers to various types of recording media capable of being accessed by the computer device via a network or communication link. For example, a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

"Computer memory" or "memory" is an example of a computer-readable storage medium. Computer memory is any memory which is directly accessible to a processor. "Computer storage" or "storage" is a further example of a computer-readable storage medium. Computer storage is any non-volatile computer-readable storage medium. For example, computer storage may also be computer memory or vice versa.

A "processor" as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer device or distributed amongst multiple computer devices. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, the program instructions can be executed on one processor or on several processors. In the case of multiple processors, they can be distributed over several different entities like clients, servers etc. Each processor could execute a portion of the instructions intended for that entity. Thus, when referring to a system or process involving multiple entities, the computer program or program instructions are understood to be adapted to be executed by a processor associated or related to the respective entity.

A "user interface" as used herein is an interface which allows a user or operator to interact with a computer or computer device. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer to indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, one or more switches, one or more buttons, and accelerometer are all examples of user interface components which enable the receiving of information or data from an operator.

A GUI element is a data object some of which's attributes specify the shape, layout and/or behavior of an area displayed on a graphical user interface, e.g., a screen. A GUI element can be a standard GUI element such as a button, a text box, a tab, an icon, a text field, a pane, a check-box item or item group or the like. A GUI element can likewise be an image, an alphanumeric character or any combination thereof. At least some of the properties of the displayed GUI elements depend on the data value aggregated on the group of data object said GUI element represents.

Aspects of the present invention are described with reference to flowchart illustrations and/or block diagrams of methods, apparatus (systems) and computer program products. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Although the invention has been described in reference to specific embodiments, it should be understood that the invention is not limited to these examples only and that many variations of these embodiments may be readily envisioned by the skilled person after having read the present disclosure. The invention may thus further be described without limitation and by way of example only by the following embodiments. The following embodiments may contain preferred embodiments. Accordingly, the term "feature combination" as used therein may refer to such a "preferred embodiment".

1. A computer-implemented method for closing one or more holes in a bottom section of a three-dimensional digital preparation model of a preparation of a tooth, the tooth being prepared for receiving a dental restoration element with a lower limit of the bottom section of the preparation being prepared in form of a stepless edge, the method comprising:

receiving the three-dimensional digital preparation model of the prepared tooth;

detecting one or more holes of the three-dimensional digital preparation model to be closed within the bottom section;

determining a preparation angle used for preparing the bottom section, the preparation angle being descriptive of an inclination of the bottom section relative to a reference direction;

closing the detected one or more holes, the closing comprising an extrapolation of the bottom section into the holes using the determined preparation angle.

2. The method of feature combination 1, the stepless edge being one of the following: a stepless feather edge, stepless knife edge.

3. The method of any of feature combinations 1 to 2, the bottom section being tapered in a coronal direction of the prepared tooth.

4. The method of any of feature combinations 1 to 3, the bottom section extending straight in the coronal direction of the prepared tooth.

5. The method of any of feature combinations 1 to 3, the bottom section comprising a curvature in the coronal direction of the prepared tooth.

6. The method of any of the previous feature combinations, the bottom section comprising an undercut in the coronal direction of the prepared tooth.

7. The method of any of the previous feature combinations, the received three-dimensional digital preparation model being generated using scan data of one of the following: the prepared tooth, an impression of the prepared tooth, a physical model of the prepared tooth.

8. The method of any of the previous feature combinations, further comprising:

selecting a location for defining a margin line for the dental restoration element on the bottom section, one or more holes of the detected one or more holes to be closed extending across the selected location for the margin line;

after the closing of the one or more holes to be closed, defining the margin line for the dental restoration element at the selected location for the margin line on the bottom section across the one or more closed holes.

9. The method of feature combination 8, the margin line extending circumferentially around the bottom section.

10. The method of any of feature combinations 8 to 9, further comprising:

receiving a three-dimensional digital gingiva model of a gingiva surrounding the prepared tooth;

projecting a horizontal gingiva contour line of a top edge of the three-dimensional digital gingiva model onto the bottom section of the three-dimensional digital preparation model, the projected gingiva contour line extending circumferentially around the bottom section;

selecting the location for the margin line on the bottom section in a first predefined distance below the projected gingiva contour line.

11. The method of feature combination 10, one or more holes of the detected one or more holes to be closed extending across the projected gingiva contour line, the one or more holes extending across the projected gingiva contour line being closed in order to be able to define the projected contour line.

12. The method of any of the feature combinations 10 to 11, the first predefined distance being a distance in the range from 0.5 to 2.5 mm, preferably from 0.75 to 1.5 mm.
13. The method of any of the feature combinations 8 to 12, the margin line being defined to extend parallel to the projected gingiva contour line.
14. The method of any of the previous feature combinations, the received three-dimensional gingiva model being generated using scan data of one of the following: the gingiva surrounding the prepared tooth, an impression of the gingiva surrounding the prepared tooth, a physical model of the gingiva surrounding the prepared tooth.
15. The method of any of the previous feature combinations, the closing of the one or more holes comprising extending the bottom section in an apical direction of the prepared tooth.
16. The method of feature combination 15, further comprising defining a bottom line below the projected gingiva contour line, the bottom line extending circumferentially around the bottom section, the bottom section being extended in the apical direction down to the bottom line.
17. The method of feature combination 16, the defining of the bottom line comprising identifying one or more bottom points of the bottom section and defining the bottom line extending through the identified bottom points.
18. The method of feature combination 17, the defining of the bottom line comprising identifying a single lowest bottom point and defining the bottom line extending through the identified lowest bottom point parallel to the selected location of the projected gingiva contour line.
19. The method of feature combination 17, the bottom line being defined in a second predefined distance below and parallel to the selected location of the projected gingiva contour line.
20. The method of any of feature combinations 10 to 19, the determined preparation angle being an angle between the projected gingiva contour line and the selected location of the margin line at a circumferential position of the bottom section, at which the bottom section extends down to the selected location of the margin line.
21. The method of any of feature combinations 1 to 19, the determined preparation angle being a preparation angle measured locally within the bottom section.
22. The method of any of feature combinations 1 to 19, the determined preparation angle being an averaged preparation angle determined using a plurality of preparation angles measured locally within the bottom section.
23. The method of any of the previous feature combinations, the determined preparation angle being a largest preparation angle of the bottom section.
24. The method of any of the previous feature combinations, comprising increasing the determined preparation angle by a first predefined amount for the extrapolation of the bottom section.
25. The method of any of the previous feature combinations, the bottom section comprising a constant preparation angle.
26. The method of feature combination 25, the preparation angle of the bottom section depending on a taper angle of a tapered bur used for preparing the bottom section, the taper angle of the tapered bur being used for determining the preparation angle of the bottom section.
27. The method of any of feature combinations 8 to 26, further comprising generating a three-dimensional digital restoration model of the dental restoration element to be arranged on the prepared tooth using the three-dimensional digital preparation model and the margin line defined for the dental restoration element.
28. The method of feature combination 27, the generating of the three-dimensional digital restoration model comprising providing a three-dimensional digital artificial tooth model, the three-dimensional digital artificial tooth model defining a form of the prepared tooth to be restored using the dental restoration element, and subtracting the three-dimensional digital preparation model from the three-dimensional digital artificial tooth model.
29. The method of feature combination 28, further comprising adjusting a tapering of the bottom section before the subtracting of the three-dimensional digital preparation model such that the adjusted bottom section comprises an adjusted constant preparation angle, the adjusted constant preparation angle being equal to a largest preparation angle of the bottom section before the adjusting.
30. The method of feature combination 28, further comprising adjusting the tapering of the tapered bottom section before subtracting the three-dimensional digital preparation model such that the adjusted bottom section comprises an adjusted constant preparation angle, the adjusted constant preparation angle being equal to a largest preparation angle of the bottom section before the adjusting increased by a second predefined amount.
31. The method of any of feature combinations 27 to 30, further comprising manufacturing the dental restoration element using the three-dimensional digital restoration model as a template, the manufactured dental restoration element being a physical copy of the respective template.
32. The method of feature combination 31, the dental restoration element being manufactured using one or more of the following: an additive method, a subtractive method.
33. The method of any of the previous feature combinations, the dental restoration element being a one of the following: a veneer, coping with coating, a crown, a partial crown, a bridge.
34. A computer program product for closing one or more holes in a bottom section of a three-dimensional digital preparation model of a preparation of a tooth, the tooth being prepared for receiving a dental restoration element with a lower limit of the bottom section of the preparation being prepared in form of a stepless edge, the computer program product comprising a computer readable storage medium having program instructions embodied therewith, the program instructions being executable by a processor of a computer device to cause the computer device to:
receive the three-dimensional digital preparation model of the prepared tooth;
detect one or more holes of the three-dimensional digital preparation model to be closed within the bottom section;

determine a preparation angle used for preparing the bottom section, the preparation angle being descriptive of an inclination of the bottom section relative to a vertical direction;

close the detected one or more holes, the closing comprising an extrapolation of the bottom section into the holes using the determined preparation angle.

35. A computer program for closing one or more holes in a bottom section of a three-dimensional digital preparation model of a preparation of a tooth, the tooth being prepared for receiving a dental restoration element with a lower limit of the bottom section of the preparation being prepared in form of a stepless edge, the computer program comprising program instructions, the program instructions being executable by a processor of a computer device to cause the computer device to:

receive the three-dimensional digital preparation model of the prepared tooth;

detect one or more holes of the three-dimensional digital preparation model to be closed within the bottom section;

determine a preparation angle used for preparing the bottom section, the preparation angle being descriptive of an inclination of the bottom section relative to a vertical direction;

close the detected one or more holes, the closing comprising an extrapolation of the bottom section into the holes using the determined preparation angle.

36. A computer device for closing one or more holes in a bottom section of a three-dimensional digital preparation model of a preparation of a tooth, the tooth being prepared for receiving a dental restoration element with a lower limit of the bottom section of the preparation being prepared in form of a stepless edge, the computer device comprising a processor and a memory storing program instructions executable by the processor, execution of the program instructions by the processor causing the computer device to:

receive the three-dimensional digital preparation model of the prepared tooth;

detect one or more holes of the three-dimensional digital preparation model to be closed within the bottom section;

determine a preparation angle used for preparing the bottom section, the preparation angle being descriptive of an inclination of the bottom section relative to a vertical direction;

close the detected one or more holes, the closing comprising an extrapolation of the bottom section into the holes using the determined preparation angle.

37. A manufacturing system comprising the computer device of feature combination 35, the manufacturing system further comprising one or more manufacturing devices configured to manufacture the dental restoration element, execution of the program instructions by the processor further causing the computer device to control the manufacturing device to:

select a location for a margin line for the dental restoration element on the bottom section, one or more holes of the detected one or more holes to be closed extending across the selected location for the margin line;

after the closing of the one or more holes to be closed, define the margin line for the dental restoration element at the selected location for the margin line on the bottom section across the one or more closed holes;

generate a three-dimensional digital restoration model of the dental restoration element to be arranged on the prepared tooth using the three-dimensional digital preparation model and the margin line defined for the dental restoration element;

manufacture the dental restoration element using the three-dimensional digital restoration model as template, the manufactured dental restoration element being a physical copy of the respective template.

38. The manufacturing system of feature combination 37, the one or more manufacturing devices comprising one or more of the following devices: a machining device, a 3D printing device.

REFERENCE SIGNS LIST 10 computer device
11 manufacturing system
14 external device
16 processing unit
18 bus
20 network adapter
22 I/O interface
24 display
28 memory
30 RAM
32 cache
34 storage system
40 program
42 program module
50 user interface
52 control elements
54 hardware device
56 keyboard
58 mouse
59 scanner
60 3D printing device
62 printing element
70 machining device
72 machining tool
74 holding device
76 blank
78 raw material
100 tooth
102 prepared tooth
104 gingiva
106 alveolar bone
108 gingival sulcus
110 preparation
111 feather edge
112 knife edge
113 chamfer edge
114 bevel edge
115 shoulder edge
116 beveled shoulder edge
120 tapered bur
122 taper angle
130 three-dimensional digital preparation model
132 three-dimensional digital gingiva model
134 bottom section
136 projected gingiva contour line
138 margin line 140 bottom line
142 three-dimensional digital artificial tooth model
144 three-dimensional digital restoration model
146 first point
148 second point
150 straight line
152 reference line
154 location of a projected gingiva contour line
156 location of a margin line
158 location of a bottom line
160 hole
162 boundary of bottom section
$D_1$ first predefined distance
$D_2$ second predefined distance
$\alpha_1$ inclination angle
$\alpha_2$ inclination angle
$\beta$ taper angle of tapered bur
$\gamma$ preparation angle

The invention claimed is:

1. A computer-implemented method for closing one or more holes in a bottom section of a three-dimensional digital preparation model of a preparation of a tooth, the tooth being prepared for receiving a dental restoration element with a lower limit of the bottom section of the preparation being prepared in form of a stepless edge, the method comprising:
   receiving the three-dimensional digital preparation model of the prepared tooth;
   detecting one or more holes of the three-dimensional digital preparation model to be closed within the bottom section;
   determining a preparation angle used for preparing the bottom section, the preparation angle being descriptive of an inclination of the bottom section relative to a reference direction;
   closing the detected one or more holes, the closing comprising an extrapolation of the bottom section into the holes using the determined preparation angle.

2. The method of claim 1, further comprising:
   selecting a location for defining a margin line for the dental restoration element on the bottom section, one or more holes of the detected one or more holes to be closed extending across the selected location for the margin line;
   after the closing of the one or more holes to be closed, defining the margin line for the dental restoration element at the selected location for the margin line on the bottom section across the one or more closed holes.

3. The method of claim 2, the margin line extending circumferentially around the bottom section.

4. The method of claim 2, further comprising:
   receiving a three-dimensional digital gingiva model of a gingiva surrounding the prepared tooth;
   projecting a horizontal gingiva contour line of a top edge of the three-dimensional digital gingiva model onto the bottom section of the three-dimensional digital preparation model, the projected gingiva contour line extending circumferentially around the bottom section;
   selecting the location for the margin line on the bottom section in a first predefined distance below the projected gingiva contour line.

5. The method of claim 4, one or more holes of the detected one or more holes to be closed extending across the projected gingiva contour line, the one or more holes extending across the projected gingiva contour line closed in order to be able to define the projected contour line.

6. The method of claim 5, the margin line being defined to extend parallel to the projected gingiva contour line.

7. The method of claim 4, further comprising defining a bottom line below the projected gingiva contour line, the bottom line extending circumferentially around the bottom section, the bottom section being extended in the apical direction down to the bottom line.

8. The method of claim 7, the defining of the bottom line comprising identifying one or more bottom points of the bottom section and defining the bottom line extending through the identified bottom points.

9. The method of claim 8, the defining of the bottom line comprising identifying a single lowest bottom point and defining the bottom line extending through the identified lowest bottom point parallel to the selected location of the projected gingiva contour line.

10. The method of claim 8, the bottom line being defined in a second predefined distance below and parallel to the selected location of the projected gingiva contour line.

11. The method of claim 2, further comprising generating a three-dimensional digital restoration model of the dental restoration element to be arranged on the prepared tooth using the three-dimensional digital preparation model and the margin line defined for the dental restoration element.

12. The method of claim 11, the generating of the three-dimensional digital restoration model comprising providing a three-dimensional digital artificial tooth model, the three-dimensional digital artificial tooth model defining a form of the prepared tooth to be restored using the dental restoration element, and subtracting the three-dimensional digital preparation model from the three-dimensional digital artificial tooth model.

13. The method of claim 12, further comprising adjusting a tapering of the bottom section before the subtracting of the three-dimensional digital preparation model such that the adjusted bottom section comprises an adjusted constant preparation angle, the adjusted constant preparation angle being equal to a largest preparation angle of the bottom section before the adjusting.

14. The method of claim 12, further comprising adjusting the tapering of the tapered bottom section before subtracting the three-dimensional digital preparation model such that the adjusted bottom section comprises an adjusted constant preparation angle, the adjusted constant preparation angle being equal to a largest preparation angle of the bottom section before the adjusting increased by a second predefined amount.

15. The method of claim 11, further comprising manufacturing the dental restoration element using the three-dimensional digital restoration model as a template, the manufactured dental restoration element being a physical copy of the respective template.

16. The method of claim 1, the closing of the one or more holes comprising extending the bottom section in an apical direction of the prepared tooth.

17. The method of claim 1, the bottom section comprising a constant preparation angle, the preparation angle of the bottom section depending on a taper angle of a tapered bur used for preparing the bottom section, the taper angle of the tapered bur being used for determining the preparation angle of the bottom section.

18. A computer program product for closing one or more holes in a bottom section of a three-dimensional digital preparation model of a preparation of a tooth, the tooth being prepared for receiving a dental restoration element with a lower limit of the bottom section of the preparation being prepared in form of a stepless edge,
   the computer program product comprising a computer readable storage medium having program instructions embodied therewith, the program instructions being executable by a processor of a computer device to cause the computer device to:

receive the three-dimensional digital preparation model of the prepared tooth;

detect one or more holes of the three-dimensional digital preparation model to be closed within the bottom section;

determine a preparation angle used for preparing the bottom section, the preparation angle being descriptive of an inclination of the bottom section relative to a vertical direction;

close the detected one or more holes, the closing comprising an extrapolation of the bottom section into the holes using the determined preparation angle.

19. A computer device for closing one or more holes in a bottom section of a three-dimensional digital preparation model of a preparation of a tooth, the tooth being prepared for receiving a dental restoration element with a lower limit of the bottom section of the preparation being prepared in form of a stepless edge, the computer device comprising a processor and a memory storing program instructions executable by the processor, execution of the program instructions by the processor causing the computer device to:

receive the three-dimensional digital preparation model of the prepared tooth;

detect one or more holes of the three-dimensional digital preparation model to be closed within the bottom section;

determine a preparation angle used for preparing the bottom section, the preparation angle being descriptive of an inclination of the bottom section relative to a vertical direction;

close the detected one or more holes, the closing comprising an extrapolation of the bottom section into the holes using the determined preparation angle.

20. A manufacturing system comprising the computer device of claim 19, the manufacturing system further comprising one or more manufacturing devices configured to manufacture the dental restoration element, execution of the program instructions by the processor further causing the computer device to control the manufacturing device to:

select a location for a margin line for the dental restoration element on the bottom section, one or more holes of the detected one or more holes to be closed extending across the selected location for the margin line;

after the closing of the one or more holes to be closed, define the margin line for the dental restoration element at the selected location for the margin line on the bottom section across the one or more closed holes;

generate a three-dimensional digital restoration model of the dental restoration element to be arranged on the prepared tooth using the three-dimensional digital preparation model and the margin line defined for the dental restoration element;

manufacture the dental restoration element using the three-dimensional digital restoration model as template, the manufactured dental restoration element being a physical copy of the respective template.

* * * * *